(12) United States Patent
Martinez Morais et al.

(10) Patent No.: US 11,343,329 B1
(45) Date of Patent: May 24, 2022

(54) TECHNIQUES FOR INCREASING PERSISTENT CONNECTION SCALABILITY

(71) Applicant: Amazon Technologies, Inc., Seattle, WA (US)

(72) Inventors: Raul Martinez Morais, Cupertino, CA (US); Jose Maria Codina Vinas, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 16/417,305

(22) Filed: May 20, 2019

(51) Int. Cl.
  *H04L 29/08* (2006.01)
  *H04L 67/145* (2022.01)
  *H04L 67/148* (2022.01)
  *H04L 43/16* (2022.01)
  *H04L 43/0882* (2022.01)
  *H04L 67/01* (2022.01)

(52) U.S. Cl.
  CPC ........ *H04L 67/145* (2013.01); *H04L 43/0882* (2013.01); *H04L 43/16* (2013.01); *H04L 67/148* (2013.01); *H04L 67/42* (2013.01)

(58) Field of Classification Search
  CPC ... H04L 67/145; H04L 43/0882; H04L 43/16; H04L 67/148; H04L 67/42
  See application file for complete search history.

(56) References Cited

U.S. PATENT DOCUMENTS

| | | | |
|---|---|---|---|
| 7,193,644 | B2 | 3/2007 | Carter |
| 7,287,082 | B1 * | 10/2007 | O'Toole, Jr. ........ H04L 67/1008 709/223 |
| 8,139,098 | B2 | 3/2012 | Carter |
| 8,144,183 | B2 | 3/2012 | Carter |
| 8,154,581 | B2 | 4/2012 | Carter |
| 8,780,201 | B1 | 7/2014 | Scalisi et al. |
| 8,823,795 | B1 | 9/2014 | Scalisi et al. |
| 8,842,180 | B1 | 9/2014 | Kasmir et al. |
| 8,872,915 | B1 | 10/2014 | Scalisi et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |

(Continued)

*Primary Examiner* — Sargon N Nano
*Assistant Examiner* — Kidest Mendaye
(74) *Attorney, Agent, or Firm* — Lee & Hayes, P.C.

(57) ABSTRACT

This disclosure describes, in part, techniques for increasing persistent connection scalability. For instance, a server may establish persistent connections with sources. The server may then determine, based on the types of persistent connections, an amount of at least one resource in use. For example, the server may determine that a first type of connection, such as an idle connection, uses a first amount of the resource(s) and a second type of connection, such as an active connection, uses a second amount of the resource(s). The server may then determine if the amount of the at least one resource in use satisfies one or more thresholds. If the amount of the at least one resource in use satisfies the one or more thresholds, the server may perform one or more actions. For example, the server may cease establishing new persistent connections, migrate the first type of connections, and/or migrate the second type of connections.

20 Claims, 12 Drawing Sheets

(56) References Cited

U.S. PATENT DOCUMENTS

| | | |
|---|---|---|
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,701,116 B2 * | 6/2020 | Poko ................. H04L 67/02 |
| 2002/0002616 A1 * | 1/2002 | Lim .................. H04L 65/80 709/227 |
| 2002/0156897 A1 * | 10/2002 | Chintalapati ......... H04L 67/142 709/227 |
| 2004/0093407 A1 * | 5/2004 | Sample ............... H04L 63/0227 709/224 |
| 2004/0186906 A1 * | 9/2004 | Torrant ................ H04L 47/70 709/225 |
| 2006/0031520 A1 * | 2/2006 | Bedekar ............. H04L 67/1002 709/227 |
| 2009/0241176 A1 * | 9/2009 | Beletski ............... G06F 9/505 726/7 |
| 2011/0191414 A1 * | 8/2011 | Ma .................. H04L 67/02 709/203 |
| 2012/0258712 A1 * | 10/2012 | Rozinov ............. H04L 65/1006 455/435.1 |
| 2014/0351449 A1 * | 11/2014 | Kramarenko ......... H04L 63/083 709/229 |
| 2017/0244793 A1 * | 8/2017 | Torok ................ H04L 67/143 |
| 2019/0222619 A1 * | 7/2019 | Shribman ............ H04L 67/02 |
| 2020/0213643 A1 * | 7/2020 | Jennings ............. H04L 47/724 |

* cited by examiner

US 11,343,329 B1

TECHNIQUES FOR INCREASING PERSISTENT CONNECTION SCALABILITY

BACKGROUND

Client devices, such as smartphones and tablet computers, may receive data from one or more sources via one or more servers. The servers may establish first connections with the sources and, using the first connections, receive the data from the sources. The servers may also establish second connections with the client devices and, using the second connections, send the data to the client devices. In some environments, when receiving the data from the sources, the servers may establish persistent connections with the sources, even though at least some of the sources may send data to the servers (and the servers may send the data to the client devices) only intermittently. By establishing the persistent connections with the sources, the servers are not required to establish new connections with the sources each time the sources begin sending data, which advantageously reduces latency in delivering the data to the client devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
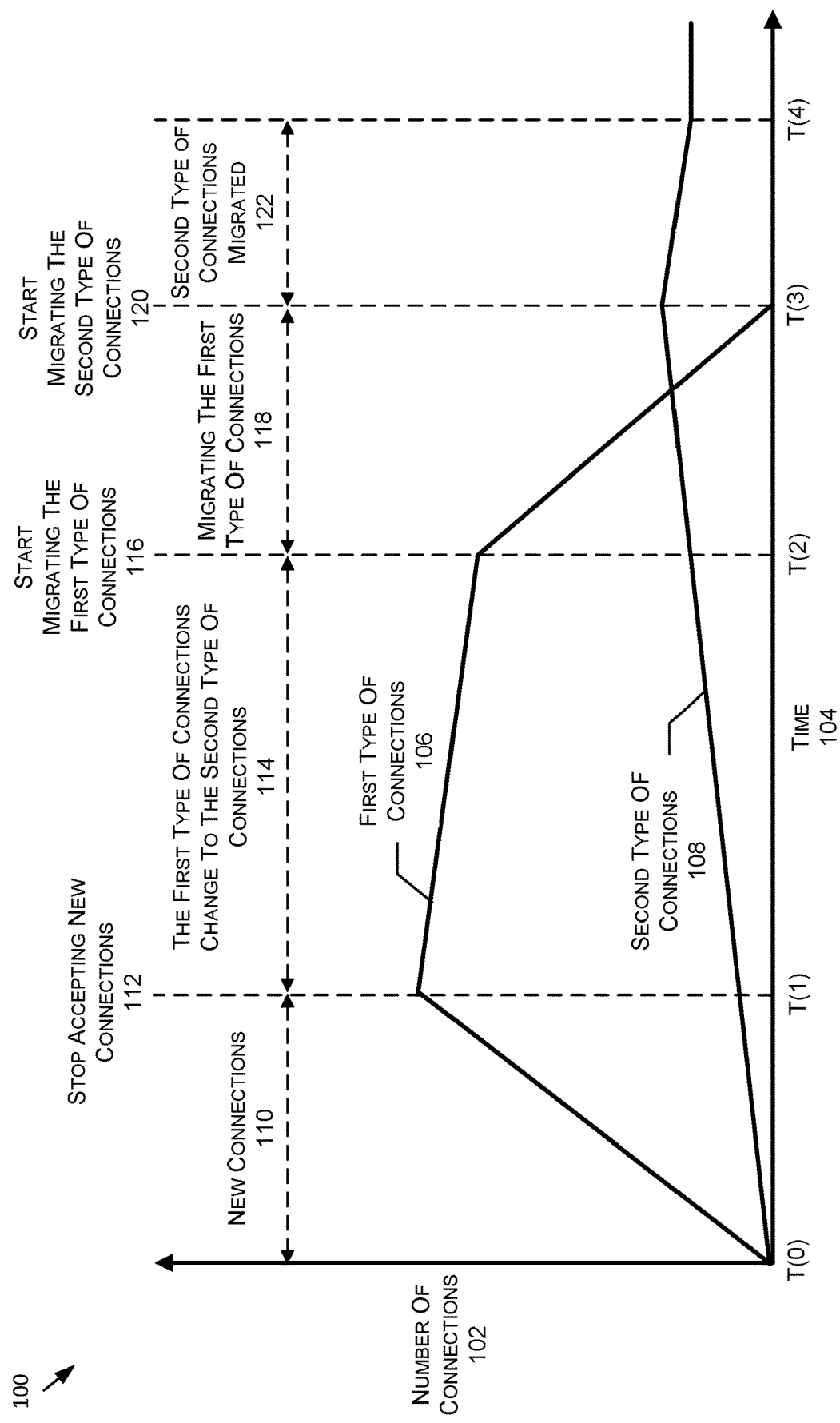
FIG. 1 is a line graph illustrating an example process for managing persistent connections, according to various aspects of the present disclosure.

When a content source is streamed to one or more endpoints, one or more cloud-based services are typically used to provide a secure and reliable mechanism for communication. In these architectures, persistent connection is implemented between two or all of these components to reduce the time-consuming connection creation process and thus reduce startup latency. Persistent connection refers to establishing a connection between two components once, and reusing the connection multiple times for continuous or discontinuous streaming sessions.

Reducing startup latency provides significant user experience benefits, including shortening the time to start content playback (image, video, audio, etc.), reducing the overall reaction time in mission-critical processing, reducing the amount of buffering for data retention required to cope with the connection establishment time, etc. However, these benefits come at the cost of reducing the scalability of the service that maintains the persistent connections, because the service typically needs to be sized to consider the possibility of all persistent connections at a given server being actively streaming. The present embodiments address this limit to persistent connection scalability with a mechanism to judiciously migrate persistent connections among servers.

The scalability of a service depends on the number of connections that a given server hosting the service can sustain. The server resources (e.g., CPU (central processing unit), memory, etc.) required to maintain an idle connection can be one order of magnitude, or more, lower than supporting an active (e.g., streaming) connection. However, due to the nature of persistent connections (e.g., long lifetime, discontinuous streaming, etc.) it is challenging to determine how many connections in a server will be active at any given time. Even if, at some point in time, only a very small percentage of sources are active, a significant amount of them may be connected to the same server, potentially bringing it down. Thus, to avoid saturating the resources of any given server, the fleet that supports that service must be sized assuming the worst case: that all the connections are simultaneously active. But this approach leads to significant underutilization of available server resources, because the instances when all connections at a given server are simultaneously active are rare. Most of the time, at least some of the connections are idle, so that resources allocated to these idle connections are not currently being used. The present embodiments describe techniques for increasing the utilization of these server resources without diminishing the user experience benefits described above.

This disclosure describes, in part, systems and techniques for increasing persistent connection scalability through local dynamic load balancing based on migrating idle connections to other servers of the service when the load of a given server grows too much, thereby saving large amounts of servers, infrastructure, and cost associated with persistent connections with negligible impact on the user experience. For instance, a server may establish persistent connections with a group of sources. A source (may also be referred to as "data source" or "content source") may include, but is not limited to, an electronic device (e.g., an audio/video (A/V) device such as a video doorbell or a security camera, a sensor, an automation device, etc.), a server, a system, and/or any other source that is capable of sending data to the server. The data may include, but is not limited to, image data (e.g., video), audio data, input data, motion data, messages (e.g., notifications, alerts, etc.), and/or any other type of data. While establishing the persistent connections, the server may monitor one or more resources being used by the persistent connections. The one or more resources may include, but are not limited to, central processing unit (CPU) resources, memory resources, network resources (e.g., bandwidth), and/or any other type of resource that the server may provide to the group of sources.

To monitor a resource, according to the present embodiments, the server may determine a type of connection for individual persistent connections. In some instances, the type of connection may include, but is not limited to, an idle connection, an active (e.g., streaming) connection, and/or any other type of connection. A persistent connection may be idle when the source is not presently sending data to the server, and/or when the server is not presently sending data received from the source to a client device. Additionally, a persistent connection may be active when a source is presently sending data to the server (e.g., the source is streaming data), and/or when the server is presently sending data to a client device. Typically, active connections consume more resources over a given length of time than idle connections consume over the same length of time.

In some instances, such as when a persistent connection is an active, the server may further determine one or more characteristics associated with the data that is sent via the persistent connection. The one or more characteristics may include, but are not limited to, a type of the data (e.g., video data, audio data, etc.), a size of the data (e.g., 1 megabyte (MB), 100 MB, 1 gigabyte (GB), etc.), whether the data includes live data (e.g., live video), and/or any other type of characteristic associated with the data. As described herein, when describing types of connections, the type of connection associated with a persistent connection may additionally, or alternatively, be based on the one or more characteristics. For example, a persistent connection may be a first type of connection when the source is sending video data, and the persistent connection may be a second type of connection when the source is sending audio data.

The server may then use the type of connection and/or the one or more characteristics to determine a resource load (e.g., an amount of computing resources being used at a given time) for the persistent connection. For instance, the server may determine that the persistent connection includes a first resource load when the type of connection is an idle connection, and that the persistent connection is a second resource load when the type of connection is an active connection. For a first example, the server may determine that a persistent connection uses 0.1% of a resource when the type of connection is an idle connection, and may determine that the persistent connection uses 1% of the resource when the type of connection is an active connection. While this is just one example of determining a percentage of a resource load to a persistent connection, in other examples the server may determine any other percentage for each type of connection. Further, in some embodiments a given persistent connection may be determined to use an amount of resources based on the type of connection (e.g., idle or active) without regard to the actual (e.g., measured) resource usage of that given persistent connection at a given time or over a given length of time. Alternatively, in some embodiments a given persistent connection may be determined to use an amount of resources based on the actual (e.g., measured) resource usage of that given persistent connection at a given time or over a given length of time.

For a second example, the server may determine that the persistent connection uses 1 MB of a resource (e.g., 1 MB of memory) when the type of connection is an idle connection, and may determine that the persistent connection uses 10 MB of the resource (e.g., 10 MB of the memory) when the type of connection is an active connection. While this is just one example of determining a size of a resource load to a persistent connection, in other examples the server may determine any other size of resource load to each type of connection.

In some instances, such as when the type of connection is an active connection, the server may determine a resource load based on one or more characteristics of the data that is sent via the active connection. For a first example, the server may determine that an active connection uses 0.5% of a resource when the data is a first type of data (e.g., audio data), and may determine that the active connection uses 1% of the resource when the data is a second type of data (e.g., video data). For a second example, the server may determine that an active connection uses 0.5% of a resource when the data is a first size of data (e.g., 1 MB), and may determine that the active connection uses 1% of the resource when the data is a second size of data (e.g., 2 MB). While these are just some examples of determining a resource load of an active connection based on one or more characteristics of the data that is sent via the active connection, in other examples the server may determine any other resource load for the active connection based on one or more characteristics of the data that is sent via the active connection.

The server may then determine a total resource load on the resource using the determined resource loads for the persistent connections. In some instances, the server may determine the total resource load by adding the determined resource loads for the persistent connections. For example, if the server determines that idle connections use 0.1% of a resource, and there are 100 idle connections, and the server determines that active connections use 1% of the resource, and there are 45 active connections, then the server may determine that the total resource load includes 55% of the resource $((100 \times 0.1\%)+(45 \times 1\%)=55\%)$. In some instances, the server may use any other algorithm(s) and/or technique(s) for determining the total resource load on the resource based on the determined resource loads for the persistent connections.

In some instances, the server may perform the techniques described herein to determine the total resource load on a resource at given time intervals (e.g., regular intervals). For example, the server may determine the total resource load every 0.001 second, 0.01 second, 0.1 second, 1 second, 5 seconds, 30 seconds, 1 minute, and/or at any other timing interval. Additionally, or alternatively, in some instances, the server may perform the techniques described herein to determine the total resource load on a resource when the server determines that a persistent connection switches from a first type of connection (e.g., an idle connection) to a second type of connection (e.g., an active connection). In such embodiments, the server may not determine the total resource load on a resource at regular intervals, but rather in response to one or more triggers, which in the foregoing example includes a change in state of at least one persistent connection. In some embodiments, however, the server may determine the total resource load on a resource both at regular intervals and in response to one or more triggers.

In further embodiments, the server may determine the total resource load on a resource at irregular intervals, where the interval length varies with the number of persistent connections of a given type. For example, as the number of persistent connections that are active increases, the interval length may decrease, such that the server determines the total load on a resource at more frequent intervals when the number of active connections is high, and at less frequent intervals when the number of active connections is low. Still, in further embodiments, the server may determine the total resource load on a resource at irregular intervals, where the interval length varies based on previous total server loads determined by the server. For example, the server may use a first time interval when the resource includes a first resource load, use a second time interval when the resource includes a second resource load, use a third time interval when the resource includes a third resource load, and/or the like. In such instances, the server may use longer time intervals as the total resource load decreases. For example, the server may use a first time interval, such as 1 second, when the resource load is at 20% of the maximum, and the server may use a second interval, such as 50 milliseconds, when the resource load is at 80% of the maximum. In some instances, the server may perform the techniques described herein to determine a respective total resource load for more than one resource. For example, the server may determine a first total resource load on CPU usage and a second total resource load on memory usage.

The server may then use the total resource load (and/or multiple total resource loads) to manage the persistent connections. For example, the server may determine to stop establishing new persistent connections with new sources when the total resource load satisfies (e.g., is equal to or greater than) a first threshold. Additionally, the server may determine to start migrating idle connections to one or more other servers when the total resource load satisfies a second threshold. Furthermore, the server may determine to start migrating active connections when the total resource load satisfies a third threshold. In various embodiments, migrating a connection may include terminating the connection at its current server and reestablishing the connection at another server.

As described herein, in some instances, a threshold may be associated with a percentage of a resource of the server. The percentage may include, but is not limited to, 50%, 60%, 75%, 80%, 90%, 95%, and/or any other percentage. For example, the first threshold may correspond to 60% of a total capacity of a resource, the second threshold may correspond to 80% of the total capacity of the resource, and the third threshold may correspond to 95% of the total capacity of the resource. Additionally, or alternatively, in some instances, a threshold may be associated with a size of a resource load on a resource. The size of the resource load may include, but is not limited to, 100 MB, 1 GB, 100 GB, and/or any other size. For example, the first threshold may correspond to 100 MB of a resource, the second threshold may correspond to 1 GB of the resource, and the third threshold may correspond to 100 GB of the resource.

Furthermore, in some instances, the thresholds may be based on the type of resource that is being monitored by the server. For example, the server may use first thresholds for a first type of resource (e.g., CPU usage) and use second thresholds for a second type of resource (e.g., memory usage). In such an example, one or more of the first thresholds may be the same as one or more of the second thresholds, and/or one or more of the first thresholds may be different than one or more of the second thresholds.

In some instances, when migrating persistent connections, one or more factors may be used to select persistent connections for migration, where migrating a persistent connection may comprise transferring the persistent connection from one server to another server. For example, when the persistent connections are the first type of connection (e.g., idle connections), the one or more factors may include, but are not limited to, the times at which the server established each persistent connection, the times at which each persistent connection switched from active to idle (e.g., selecting those connections that have been idle the longest), a frequency at which each persistent connection switches from idle to active (e.g., selecting those connections that are least active on average), a priority assigned to each persistent connection (e.g., selecting those connections that have the lowest priority), and the like. Additionally, when the persistent connections are the second type of connection (e.g., active connections), one or more factors may include, but are not limited to, the time at which the server established each persistent connection, the time at which each persistent connection switched from idle to active, a frequency at which each persistent connection switches from active to idle, an average length of time that each persistent connection is active, whether each persistent connection includes live views, types of data being streamed using each persistent connection, and the like. In some embodiments, the selection of persistent connections to be migrated may be random, although in such a schema it may still be preferred to migrate idle connections before migrating active connections.

For a first example, if the server determines to start migrating idle connections, the server may migrate idle connections that have not streamed data for a first length of time before migrating idle connections that have not streamed data for a second length of time. In such an example, the first length of time may be greater than the second length of time. For a second example, if the server determines to start migrating active connections, the server may determine to migrate active connections that are not sending live view data before migrating active connections that are sending live view data. For a third example, and again if the server determines to start migrating active connections, the server may determine to start migrating active connections based on when the active connections began sending data. For instance, the server may migrate a first active connection that began sending data at a first time before migrating a second active connection that began sending data at a second, earlier time, or vice versa.

In some instances, to migrate a persistent connection, the server may terminate the persistent connection with the source. Another server may then establish a new persistent connection with the source. Additionally, or alternatively, in some instances, the server may wait until the additional server has established the new persistent connection with the source before terminating the current persistent connection. As such, if a client device is sending data from the source, the client device may continue to stream the data without experiencing any interruption or latency associated with establishing the new connection.

In some instances, the server may further cause the additional server to establish the new persistent connection with the source. For example, an environment may include multiple servers, where individual servers perform the techniques described herein to monitor persistent connections. As such, the server may receive, from at least one other server, data indicating the total resource load on the other server. The server may then analyze the data to determine that the at least one other server has the resources necessary to establish the persistent connection with the source. As such, the server may send data to the source and/or the other server, where the data is associated with establishing the new persistent connection between the source and the other server.

The present embodiments advantageously achieve greater utilization of available server resources, and are capable of maintaining a greater number of persistent connections, as compared with other systems that establish persistent connections with sources. For instance, other systems that establish persistent connections with sources treat each persistent connection as an active and worst-case scenario connection, even when at least some of the connections are idle. This technique ensures that adequate resources are always available to handle all persistent connections, even if all of the persistent connections are active at the same time. However, this technique disadvantageously reduces the number of persistent connections that such systems are capable of establishing, and underutilizes available resources, since these systems typically have significant unused resources at any given time, particularly when a large portion of the persistent connections are idle.

In contrast, the present embodiments determine the total resource load on at least one resource based on the types of connections that the server establishes. For example, in some embodiments, an idle connection may be determined to use x resources, while an active connection may be determined to use y resources, where y>x. In some of these embodiments, resource usage by a connection of a given type may be set at a predetermined fixed amount, while in others of these embodiments resource usage by a connection of a given type may be determined according to actual use over a given length of time. In either scenario, the present embodiments are capable of establishing a greater number of persistent connections for a given server as compared to prior art systems, such as when a large portion of the persistent connections are idle, because the present embodiments do not treat all persistent connections the same.

As described herein, a persistent connection may include a network connection channel that remains open between the server and a source, where the network connection channel is for sending/receiving data. In some instances, to keep the persistent connection open, the server may send data to and/or receive data from the source, such as at given time intervals, in order to prevent the persistent connection from timing out. In some instances, a persistent connection may include, but is not limited to, a Hypertext Transfer Protocol (HTTP) connection, and/or any other type of persistent connection. Additionally, as described herein, a server may include, but is not limited to, one or more computing devices, one or more servers, one or more systems, and/or any other device(s) that are capable of receiving data from a source and sending the data to a client device.

In some instances, a persistent connection is an idle connection when a data source sends data to and/or receives data from a server using the persistent connection, where the data is solely for keeping the persistent connection open. For instance, the data may include beacons (e.g., a keepalive message) that are sent between the data source and the server at given time intervals, where the beacons are used by the data source and/or the server to determine that the persistent connection is still open. Additionally, the beacons may be used by the data source and/or the server to ensure that the persistent connection does not timeout and/or terminate. However, in some instances, when a persistent connection is an idle connection, the data source is not sending other data (e.g., image data, audio data, input data, motion data, etc.) to the server. In some instances, and as described herein, the other data may include application data, such as the image data, the audio data, the input data, the motion data, the message data, and/or the like. In such instances, the application data may not include the data (e.g., the beacons) that is solely for keeping the persistent connection alive.

Additionally, in some instances, a persistent connection is an active connection when the data source is sending additional data (e.g., application data) to the server using the persistent connection, where the additional data may include any data beyond the data that is sent to keep the persistent connection open. For instance, the additional data may include, but is not limited to, image data, audio data, input data, motion data, and/or the like. Additionally, or alternatively, in some instances, a persistent connection is an active connection when the server is sending data being received from the data source, via the persistent connection, to a client device.

Additionally, as described herein, a data source may establish a new persistent connection by sending, to a Front End (FE) server, a request to establish a new connection. The FE server may then forward the request to a load balancing server. In some instances, the load balancing server includes a queue of requests that have been received for establishing persistent connections with data sources. The load balancing server may then select a server for establishing the persistent connection. For example, the load balancing server may store data indicating which servers are accepting new persistent connections and which servers are not accepting new persistent connections. The load balancing server may then select one of the servers that is accepting new persistent connections. After selecting the server, the server may establish the persistent connection with the data source.

Additionally, or alternatively, in some instances, the data source may send the request to establish the persistent connection directly to the load balancing server. The load balancing server may then, after receiving the request, determine which server to select for establishing the new persistent connection. Additionally, or alternatively, in some instances, the FE server may determine which server to select for establishing the new persistent connection. In such instances, the FE server may include a queue of requests that have been received for establishing persistent connections with data sources.

In some instances, to terminate a persistent connection, a first server will terminate a first persistent connection from a data source. The data source may then perform the techniques described above to establish a second persistent connection with a second server (e.g., sending the request). In some instances, the data source performs the techniques described above to establish the second persistent connection after determining that the first persistent connection with the first server has been terminated. For instance, the data source may determine that the data source is unable to send and/or receive data with the first server. In some instances, the data source performs the techniques described above to establish the second persistent connection with the second server after receiving, from the first server, data indicating that the first persistent connection has been terminated.

Additionally, or alternatively, in some instances, to terminate a persistent connection, the first server may send a request to the data source to terminate the first persistent connection. Based on receiving the request, the data source may then terminate the first persistent connection with the first server. The data source may then perform the techniques described above to establish the second persistent connection with the second server. In some instances, before terminating the first persistent connection with the first server, the data source may send data to the first server that indicates that the first persistent connection will be terminated.

Additionally, or alternatively, in some instances, to terminate a persistent connection, the first server may send a request to the FE server that requests the FE server to select a new server. The FE server may then select the second server for establishing the second persistent connection with the data source, using the techniques described herein. After the second persistent connection is established, the first server and/or the data source may then terminate the first persistent connection. By using this technique, the data source may continually establish persistent connections with the servers (e.g., there will not be a period of time in which the data source is not connected with at least one of the servers).

Furthermore, in some instances, a server may perform first processes for terminating an idle connection and second processes for terminating an active connection. For example, since a data source may not currently be using the idle connection to send data to the server, the server may terminate the idle connection with the data source. The data source may then perform the techniques described above to establish a new persistent connection with a new server. Additionally, since a data source may currently be using the active connection to send data to the server, the server may send, to the data source, a request to establish a new persistent connection with a new server. The server and/or the data source may then terminate the persistent connection once the data source establishes the new persistent connection with the new server. In this way, data sent by the data source is not lost during a time period in which the persistent connection is terminated and the new persistent connection is established.

Moreover, as described herein, an electronic device may be providing a live view when the electronic device is (1) generating, using a camera, image data representing one or more images (e.g., live view data representing a video) and (2) sending the image data to the server as the image data is being generated. The server may then send the image data to a client device as the server is receiving the image data from the electronic device. As such, a user of the client device is able to view a current state of the environment for which the electronic device is located since the client device is displaying the one or more images at approximately the same time (e.g., within a millisecond, ten milliseconds, a second, etc.) that the electronic device is generating the image data representing the one or more images. Additionally, when the electronic device is providing the live view, the electronic device may further be generating, using microphone(s), audio data representing sound located within the environment and sending the audio data as the audio data is being generated. The client device may then receive the audio data from the server and, in response, output the sound represented by the audio data.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a line graph 100 illustrating an example process for managing persistent connections, according to various aspects of the present disclosure. In the example of FIG. 1, the graph 100 illustrates the number of connections 102 (y-axis) that a server establishes over a period of time 104 (y-axis), where the number of connections 102 are a first type of connections 106 and a second type of connections 108. In some instances, the first type of connections 106 are idle connections and the second type of connections 108 are active connections. However, in other instances, the first type of connections 106 and/or the second type of connections 108 may be other types connections. For example, the first type of connections 106 may be persistent connections that are active and transmitting a first type of data while the second type of connections 108 may be persistent connections that are active and transmitting a second type of data.

As shown, between time T(0) and time T(1), the server may establish new connections 110. The new connections 110 may include both the first type of connections 106 (e.g., idle connections) and the second type of connections 108 (e.g., active connections). Additionally, between time T(0) and time T(1), at least a portion of the idle connections may become active connections and/or at least a portion of the active connections may become idle connections. As the number of connections increases between time T(0) and time T(1), the total resource load on at least one resource of the server may increase.

At time T(1), the server may determine the total resource load on the at least one resource. For example, the server may determine a first resource load for the first type of connections 106 by multiplying the total number of first-type connections 106 at time T(1) by a resource load associated with the first type of connections 106. Additionally, the server may determine a second resource load for the second type of connections 108 by multiplying the total number of second-type connections 108 at time T(1) by a resource load associated with the second type of connections 108. The server may then determine the total resource load by adding the first resource load to the second resource load.

Continuing with the example of FIG. 1, at time T(1) the server may determine that the total resource load satisfies a first threshold load (described in further detail below). As such, at time T(1) the server may determine to stop accepting new connections 112. Therefore, between time T(1) and time T(2), the server may refrain from establishing new connections with new sources. However, between time T(1) and time T(2), a portion of the first type of connections 106 may change to the second type of connections 108, as indicated in region 114 by the decrease in the first type of connections 106 and the increase in the second type of connections 108. For example, a portion of the idle connections may begin sending data, resulting in that portion of the idle connections changing to active connections.

At time T(2), the server may again determine the total resource load on the at least one resource. For example, the server may determine a first resource load for the first type of connections 106 by multiplying the total number of first-type connections 106 at time T(2) by the resource load associated with the first type of connections 106. Additionally, the server may determine a second resource load for the second type of connections 108 by multiplying the total number of the second-type connections 108 at time T(2) by the resource load associated with the second type of connections 108. The server may then determine the total resource load by adding the first resource load to the second resource load.

In the example of FIG. 1, at time T(2) the server may determine that the total resource load satisfies a second threshold load (described in further detail below). As such, at time T(2) the server may determine to start migrating the first type of connections 116. Therefore, between time T(2) and time T(3), the server may migrate at least some of the first type of connections 118. However, between time T(2) and time T(3), a portion of the first type of connections 106 may change to the second type of connections 108. Therefore, the number of the second type of connections 108 may increase in region 118 due to first-type connections 106 changing to second-type connections 108, while the number of first-type connections 106 may decrease in region 118 due to first-type connections 106 changing to second-type connections 108, and also due to migration of first-type connections 106. In some cases, the number of idle connections may decrease to zero at time T(3) while the number of active connections increases across region 118.

At time T(3), the server may again determine the total resource load on the at least one resource. For example, the server may determine a first load for the first type of connections 106 by multiplying the total number of first-type connections 106 at time T(3), which in the example of FIG. 1 is zero, by the resource load associated with the first type of connections 106. Additionally, the server may determine a second resource load for the second type of connections 108 by multiplying the total number of second-type connections 108 at time T(3) by the resource load associated with the second type of connections 108. The server may then determine the total resource load by adding the first resource load to the second resource load.

In the example of FIG. 1, at time T(3) the server may determine that the total resource load satisfies a third threshold load (described in further detail below). As such, and at time T(3), the server may determine to start migrating (e.g., terminating) the second type of connections 120. Therefore, between time T(3) and time T(4), the server may migrate the second type of connections 122. In some instances, the server may continue migrating the second type of connections 108 until the total resource load on the at least one resource no longer satisfies (e.g., is less than) the third threshold load.

For instance, at time T(4) the server may again determine the total resource load on the at least one resource. For example, the server may determine a first resource load for the first type of connections 106 by multiplying the total number of first-type connections 106 at time T(4), which in the example of FIG. 1 is zero, by the resource load associated with the first type of connections 106. Additionally, the server may determine a second resource load for the second type of connections 108 by multiplying the total number of second-type connections 108 at time T(4) by the resource load associated with the second type of connections 108. The server may then determine the total resource load by adding the first load to the second resource load.

At time T(4), the server may determine that the total resource load no longer satisfies the third threshold load. As such, the server may cease migrating additional connections. Therefore, and as shown in the example of FIG. 1, the number of the second type of connections 108 remains constant after time T(4).

Figure 2:
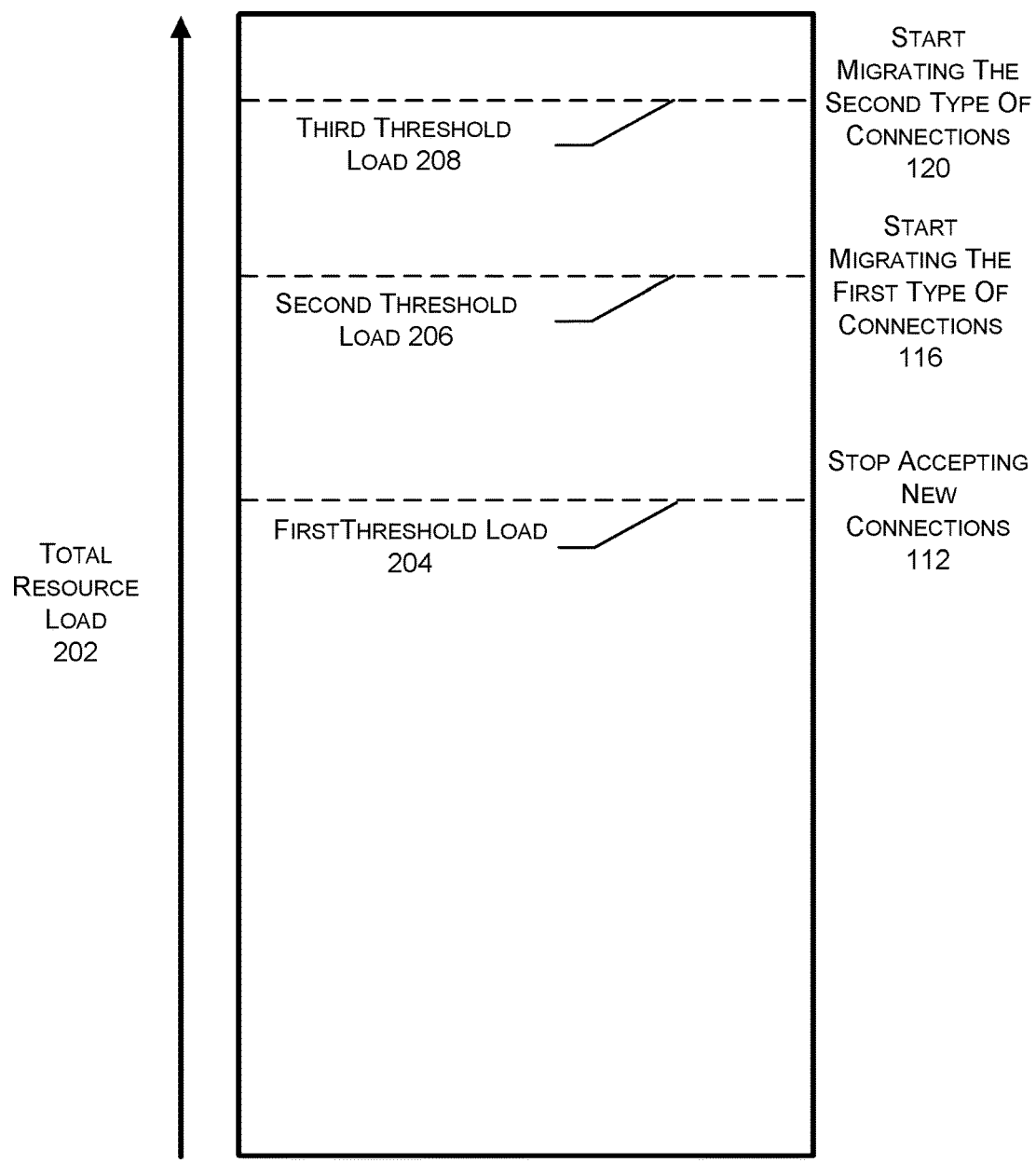
FIG. 2 is a bar graph illustrating another example process for managing persistent connections, according to various aspects of the present disclosure.

FIG. 2 is a bar graph 200 illustrating another example process for managing persistent connections, according to various aspects of the present disclosure. As shown, as the total resource load 202 (y-axis) on the at least one resource of the server begins to increase, the server may manage the persistent connections using different techniques. For example, when the total resource load 202 satisfies a first threshold load 204, the server may stop accepting new connections 112. Additionally, when the total load 202 satisfies a second threshold load 206, the server may start migrating the first type of connections 116. Furthermore, when the total resource load 202 satisfies a third threshold load 208, the server may start migrating the second type of connections 120.

Figure 3:
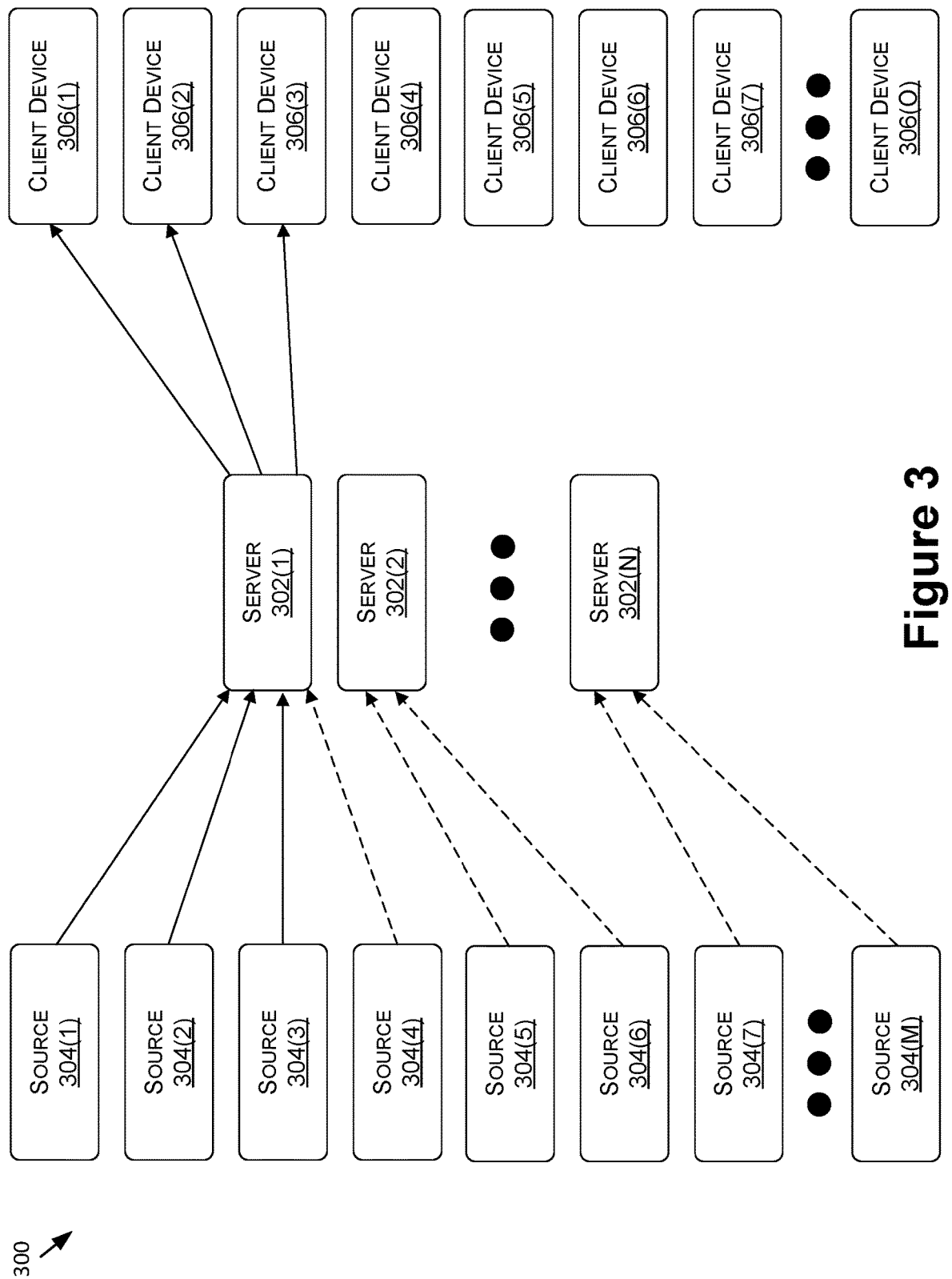
FIG. 3 is a functional block diagram illustrating an example environment of servers establishing persistent connections with sources, according to various aspects of the present disclosure.

FIG. 3 illustrates an example environment 300 of servers 302(1)-(N) establishing persistent connections with sources 304(1)-(M), according to various aspects of the present disclosure. The sources 304(1)-(M) (may also be referred to as "data sources" or "content sources") may include, but are not limited to, electronic devices (e.g., audio/video (A/V) devices such as video doorbells or security cameras, sensors, automation devices, etc.), servers, systems, and/or any other source that is capable of sending data to the server. The data may include, but is not limited to, image data (e.g., video), audio data, messages (e.g., notifications, alerts, etc.), and/or any other type of data.

In some instances, one or more of the sources 304(1)-(M) may be associated with one or more of the client devices 306(1)-(O). For example, the first source 304(1) may be associated with the first client device 306(1) such that the first source 304(1) begins sending data to the first client device 306(1) when an event is detected at the first source 304(1). For example, if the first source 304(1) is an A/V device (e.g., a video doorbell), the first source 304(1) may begin sending the data to the first client device 306(1) when motion is detected at the first source 304(1).

As shown, the first server 302(1) may establish four persistent connections with the sources 304(1)-(4) (as indicated by the arrows), the second server 302(2) may establish two persistent connections with the sources 304(5)-(6) (as indicated by the arrows), and the Nth server 302(N) may establish at least two persistent connections with the sources 304(7)-(N). In the example of FIG. 3, the dashed lines may indicate a first type of connection, such as idle connections, and the solid lines may indicate a second type of connection, such as active connections. For instance, the first source 304(1) may stream data to the first client device 306(1), the second source 304(2) may stream data to the second client device 306(2), and the third source 304(3) may stream data to the third client device 306(3). However, the fourth source 304(4), which may be associated with the fourth client device 306(4), may be idle.

In the example of FIG. 3, the first server 302(1) may determine a total resource load associated with at least one resource based on the persistent connections with the sources 304(1)-(4), the second server 302(2) may determine a total resource load associated with at least one resource based on the persistent connections with the sources 304(5)-(6), and the Nth server 302(N) may determine a total resource load associated with at least one resource based on the persistent connections 304(7)-(M). The servers 302(1)-(N) may then determine whether to stop establishing new persistent connections and/or migrate persistent connections based on the total resource loads, where migrating a persistent connection may comprise transferring the persistent connection from one server 302(1)-(N) to another server 302(1)-(N).

For example, if the first server 302(1) determines that the total resource load satisfies the first threshold load 204, then the first server 302(1) may stop establishing new persistent connections. Additionally, if the first server 302(1) determines that the total resource load satisfies the second threshold load 206, then the first server 302(1) may migrate a first type of connection, such as the persistent connection associated with the fourth source 304(4). One of the other servers 302(1)-(N) may then establish a new persistent connection with the fourth source 304(4). Furthermore, if the first server 302(1) determines that the total resource load satisfies the third threshold load 208, then the first server 302(1) may migrate a second type of connection, such as the persistent connection associated with the first source 304(1). One of the other servers 302(2)-(N) may then establish a new persistent connection with the first source 304(1).

Figure 4:
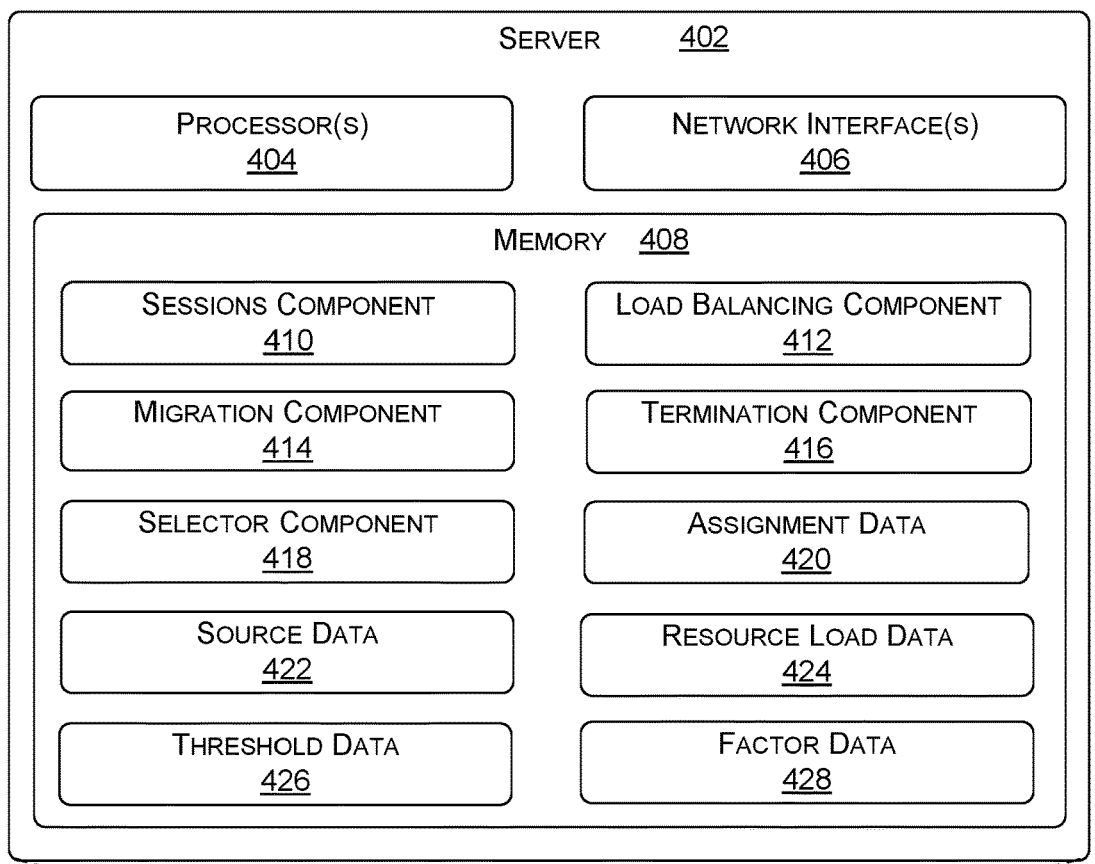
FIG. 4 is a functional block diagram illustrating one example embodiment of a server, according to various aspects of the present disclosure.
Figure 4:
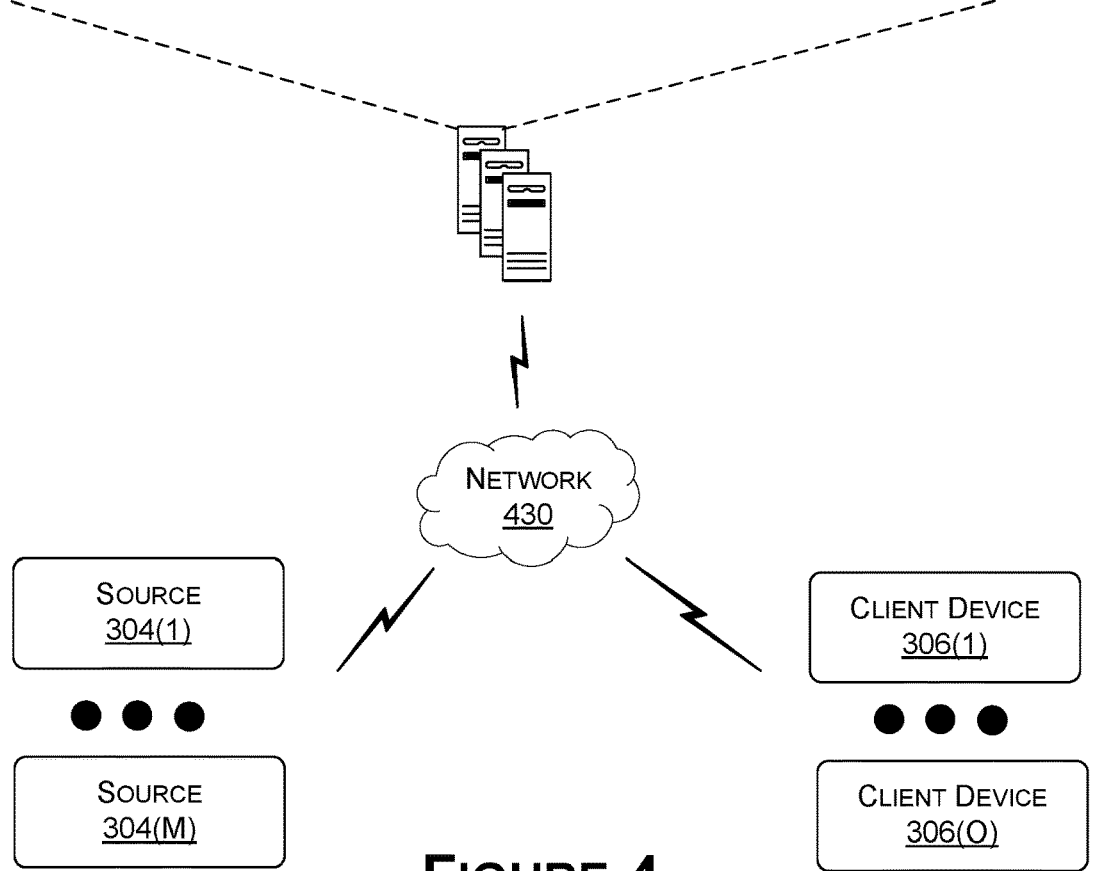

FIG. 4 is a functional block diagram illustrating one example embodiment of a server 402, according to various aspects of the present disclosure. In some instances, the server 402 may include, and/or represent, one of the servers 302(1)-(N). For ease of illustration, each of the servers 302(1)-(N) shown in FIG. 3 is represented by a single box. In various embodiments, however, each of the servers 302 (1)-(N) may include separate servers on the receive side and the transmit side. As shown in FIG. 4, the server 402 includes processor(s) 404, network interface(s) 406, and memory 408. The memory 408 stores at least a sessions component 410, a load balancing component 412, a migration component 414, a termination component 416, and a selector component 418.

The sessions component 410 may use assignment data 420 to determine resource loads to persistent connection(s) that the server 402 establishes with the sources 304(1)-(M). For instance, the assignment data 420 may indicate a respective resource load for different types of connections and/or a respective resource load for persistent connections based on one or more characteristics associated with the source data 422 being received via the persistent connections. For a first example, the assignment data 420 may represent a first weight for a persistent connection when the persistent connection are a first type of connection, and may represent a second weight for the persistent connection when the persistent connection is a second type of connection. For a second example, the assignment data 420 may represent a first weight of a resource for a persistent connection when the persistent connection is sending source data 422 that includes a first characteristic, and may represent a second weight of the resource for the persistent connection when the persistent connection is sending source data 422 that includes a second characteristic.

The sessions component 410 may further determine a total resource load on at least one resource using the determined resource load(s) for the persistent connections. In some instances, the sessions component 410 may then generate resource load data 424 representing the total resource load on the at least one resource. In such instances, the server 402 may send the resource load data 424 to one or more other servers.

The load balancing component 412 may analyze the total resource load to determine whether the total resource load satisfies one or more thresholds, which are represented by threshold data 426. In some instances, the load balancing component 412 may determine to stop establishing new persistent connections when the total resource load satisfies a first threshold (e.g., the first threshold load 204). Additionally, the load balancing component 412 may determine to start migrating persistent connections that are a first type of connection when the total resource load satisfies a second threshold (e.g., the second threshold load 206). Furthermore, the load balancing component 412 may determine to start migrating (e.g., terminating) persistent connections that are a second type of connection when the total resource load satisfies a third threshold (e.g., the third threshold load 208).

In some instances, the selector component 418 may analyze resource load data 424 generated by one or more other servers. Based on the analysis, the selector component 418 may identify at least one other server for migrating a persistent connection. For a first example, the selector component 418 may identify the server that includes the lowest resource load on the at least one resource. For a second example, the selector component 418 may identify the server that includes the lowest resource loads on all of the resources. For instance, the selector component 418 may determine the average of the resource loads for the resources. The selector component 418 may then identify the server with the lowest average resource load.

The migration component 414 may migrate persistent connections that are the first type of connection when the resource load satisfies a threshold (e.g., the second threshold). In some instances, the migration component 414 selects persistent connections to migrate using one or more factors, which are represented by the factor data 428. As discussed herein, the one or more factors may include, but are not limited to, times at which the server 402 established the persistent connections, times at which the persistent connections switched from the second type of connection to the first type of connection, a frequency at which the persistent connections switch from the first type of connection to the second type of connection, an average length of time that the persistent connections are the first type of connection, and the like.

The termination component 416 may migrate (e.g., terminate) persistent connections that are the second type of connection when the resource load satisfies a threshold (e.g., the third threshold). In some instances, the termination component 416 selects persistent connections to migrate using one or more factors, which are also represented by the factor data 428. The one or more factors may include, but are not limited to, times at which the server 402 established the persistent connections, times at which the persistent connections switched from the first type of connection to the second type of connection, a frequency at which the persistent connections switch from the second type of connection to the first type of connection, an average length of time that the persistent connections are the second type of connection, whether the persistent connections include live views, types of data being streamed using the persistent connections, and the like.

As used herein, a processor, such as the processor(s) 404, may include multiple processors and/or a processor having multiple cores. Further, the processor(s) 404 may comprise one or more cores of different types. For example, the processor(s) 404 may include application processor units, graphic processing units, and so forth. In one instance, the processor(s) 404 may comprise a microcontroller and/or a microprocessor. The processor(s) 404 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 408, may include volatile and nonvolatile memory, removable and non-removable media implemented in any method or technology for storage of information, such as computer-readable instructions, data structures, program component, or other data. The memory 408 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 408 may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s) 404.

Further, functional components may be stored in the memory 408, or the same functionality may alternatively be implemented in hardware, firmware, application specific integrated circuits, field programmable gate arrays, or as a system on a chip (SoC). In addition, while not illustrated, the memory 408 may include at least one operating system (OS) component that is configured to manage hardware resource devices such as the network interface(s), the I/O devices of the respective apparatuses, and so forth, and provide various services to applications or components executing on the processor(s) 404. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network interface(s), such as the network interface(s) 406, may enable messages to be sent and received between the server 402, the sources 304(1)-(M), the client devices 306(1)-(0), and/or with one or more other electronic devices. The network interface(s) 406 may include one or more network interface controllers (NICs) or other types of transceiver devices to send and receive messages over network(s) 430. For instance, the network interface(s) 406 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, the network interface(s) 406 may include a wide area network (WAN) component to enable message over a wide area network.

Figure 5:
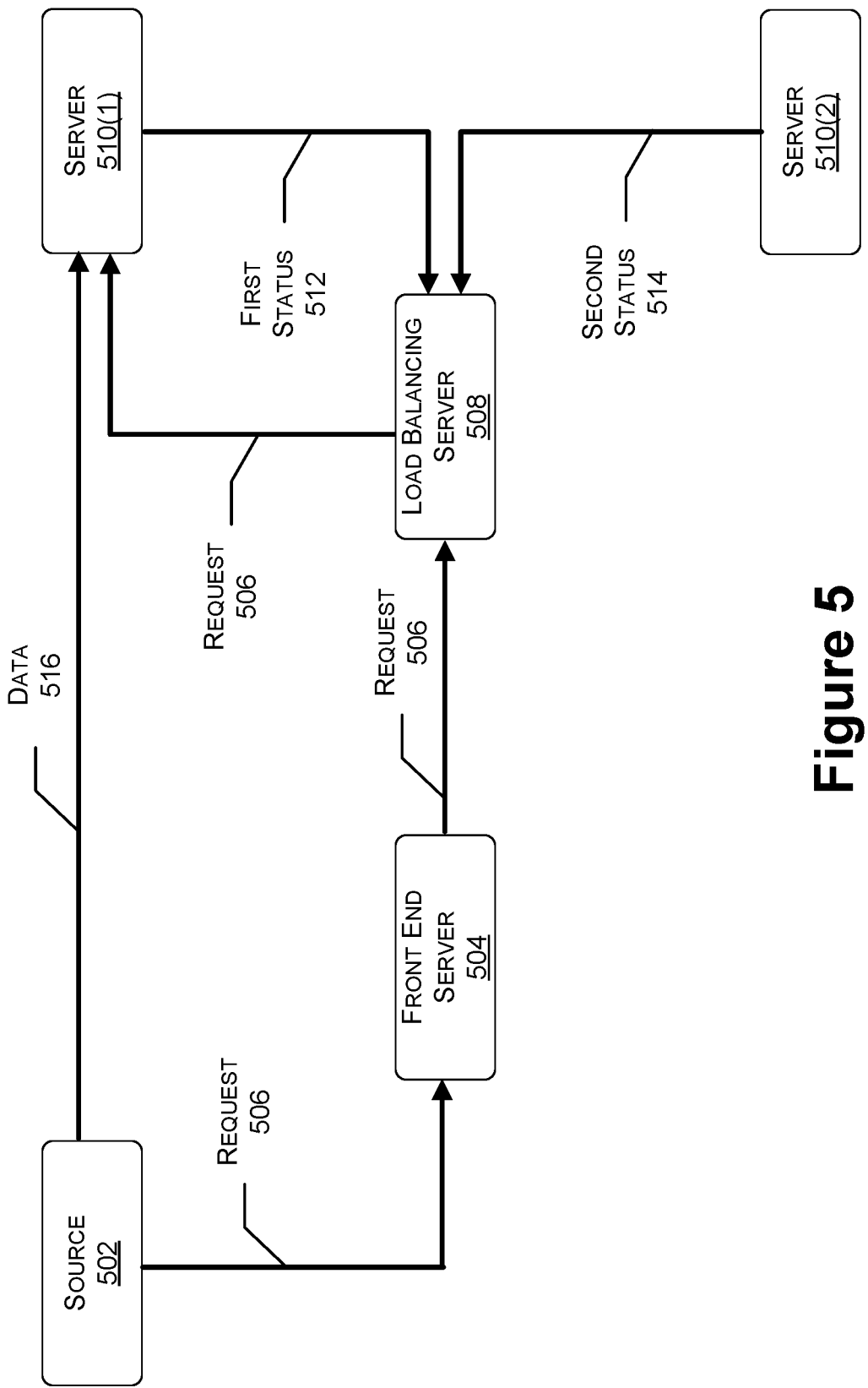
FIG. 5 is a block diagram illustrating an example of establishing a persistent connection, according to various aspects of the present disclosure.

FIG. 5 is a bock diagram illustrating an example of establishing a persistent connection, according to various aspects of the present disclosure. A data source 502 may establish a new persistent connection by sending, to a front end (FE) server 504, data representing a request 506 to establish the persistent connection. The FE server 504 may then forward data representing the request to a load balancing server 508. In some instances, the load balancing server 508 includes a queue of requests that have been received for establishing persistent connections with data sources. The load balancing server 508 may then select a server for establishing the persistent connection.

For example, the load balancing server 508 may receive, from a first server 510(1), data indicating a first status 512 specifying that the first server 510(1) is accepting new persistent connections. Additionally, the load balancing server 508 may receive, from a second server 512(2), data representing a second status 514 specifying that the second server 510(s) is not accepting new persistent connections. In some instances, the load balancing server 508 may then store data indicating that the first server 510(1) is accepting new persistent connections and data indicating that the second server 510(2) is not accepting new persistent connections. The load balancing server 508 may then select the first server 510(1). Additionally, the load balancing server 508 may send, to the first server 510(1), the data representing the request 506. After receiving the data, the first server 510(1) may establish the persistent connection with the source 502 and, after establishing the persistent connection, begin receiving data 516 from the source 502 using the persistent connection.

Additionally, or alternatively, in some instances the data source 502 may send the data representing the request 506 directly to the load balancing server 508. The load balancing server 508 may then, after receiving the request 506, perform the techniques above to select the first server 510(1). Additionally, or alternatively, in some instances the FE server 504 may determine which server to select for establishing the new persistent connection, using the techniques described herein with respect to the load balancing server 508.

FIGS. 6A-9 illustrate processes for increasing persistent connection scalability, according to various aspects of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 6A:
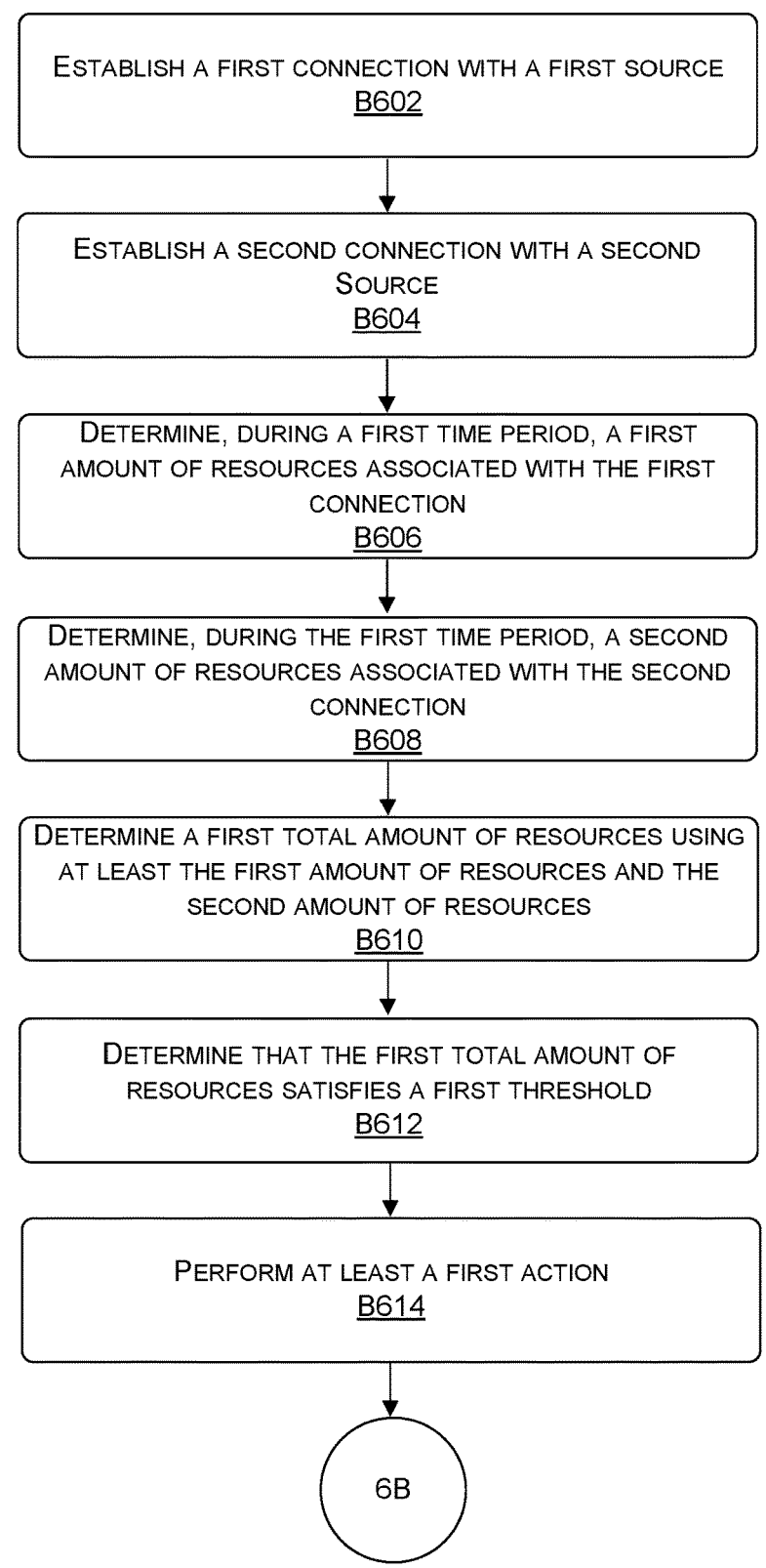
FIGS. 6A-6B are flowcharts illustrating an example process for increasing persistent connection scalability, according to various aspects of the present disclosure.
Figure 6B:
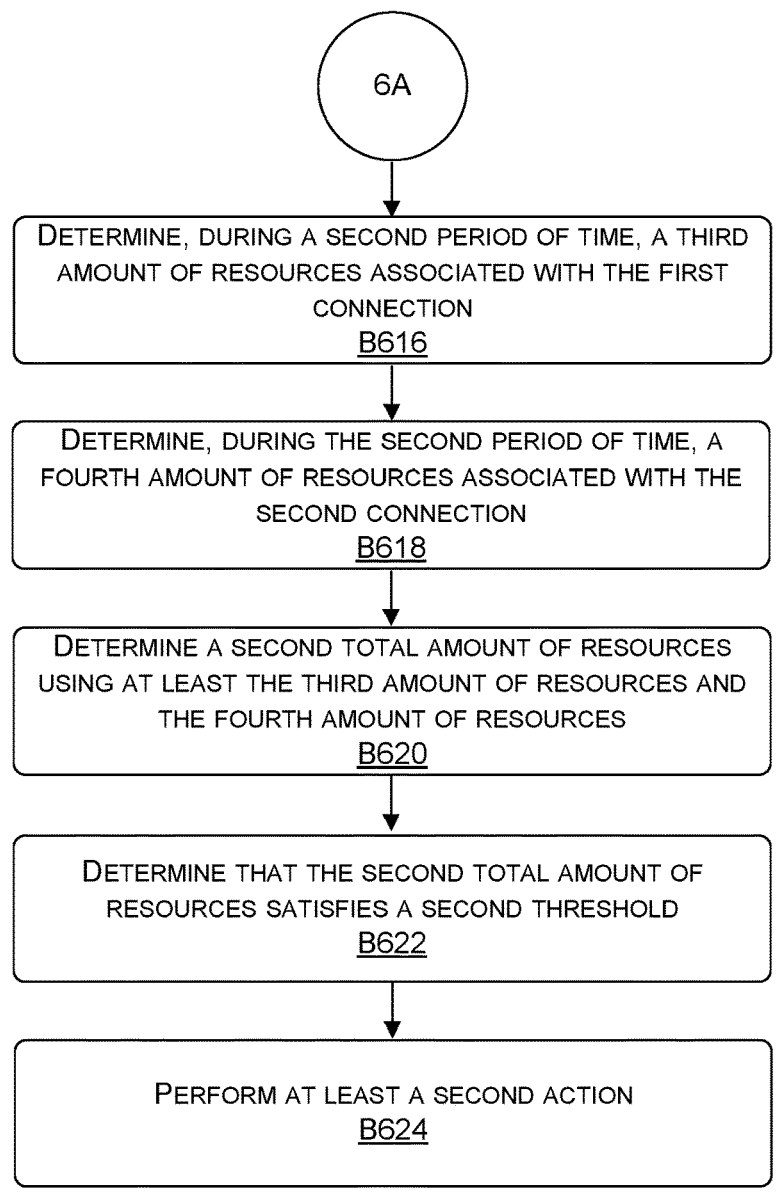

FIGS. 6A-6B illustrate an example process 600 for increasing persistent connection scalability, according to various aspects of the present disclosure. At block B602, the process 600 may include establishing a first connection with a first source. For instance, with reference to FIG. 3, the first server 302(1) may establish the first connection with the first source 304(1). In some instances, the first connection is a first persistent connection that the first server 302(1) establishes with the first source 304(1). In some instances, the first connection may include a first type of connection (e.g., an idle connection) when the first source 304(1) is not sending data to the first server 302(1) and a second type of connection (e.g., an active connection) when the first source 304(1) is sending data to the first server 302(1) via the first connection.

At block B604, the process 600 may include establishing a second connection with a second source. For instance, with reference to FIG. 3, the first server 302(1) may establish the second connection with the second source 304(2). In some instances, the second connection is a second persistent connection that the first server 302(1) establishes with the second source 304(2). In some instances, the second connection is the first type of connection when the second source 304(2) is not sending data to the first server 302(1)

and the second type of connection when the second source 304(2) is sending data to the first server 302(1) via the second connection.

At block B606, the process 600 may include determining, during a first period of time, a first amount of resources associated with the first connection. For instance, the first server 302(1) may determine the first amount of resources associated with the first connection. In some instances, to determine the first amount of resources, the first server 302(1) may determine the type of connection. The type of connection may be based on whether the first connection is the first type of connection (e.g., idle), whether the first connection is the second type of connection (e.g., active), and/or one or more characteristics associated with the source data 422 being received from the first source 304(1) via the first connection. The first server 302(1) may then determine the first amount of resources based on the type of connection.

At block B608, the process 600 may include determining, during the first period of time, a second amount of resources associated with the second connection. For instance, the first server 302(1) may determine the second amount of resources associated with the second connection. In some instances, to determine the second amount of resources, the first server 302(1) may determine the type of connection. The type of connection may be based on whether the second connection is the first type of connection, whether the second connection is the second type of connection, and/or one or more characteristics associated with the source data 422 being received from the second source 304(2) via the second connection. The first server 302(1) may then determine the second amount of resources based on the type of connection.

At block B610, the process 600 may include determining a first total amount of resources using the first amount of resources and the second amount of resources. For instance, the first server 302(1) may determine, using the first amount of resources and the second amount of resources, the first total amount of resources associated with a resource. In some instances, the first server 302(1) determines the first total amount of resources by adding together the first amount of resources and the second amount of resources.

At block B612, the process 600 may include determining that the first total amount of resources satisfies a first threshold. For instance, the first server 302(1) may determine that the first amount of resources satisfies the first threshold. In some instances, the first threshold is associated with ceasing establishing additional connections. In some instances, the first threshold is associated with migrating connections that are the first type of connection.

At block B614, the process 600 may include performing at least a first action. For instance, based on the first total amount of resources satisfying the first threshold, the first server 302(1) may perform the first action. In some instances, performing the first action may include ceasing establishing additional connections with additional sources. In such instances, the first source 302(1) may send, to one or more computing devices, data indicating that the first server 302(1) is not accepting new persistent connections with new data sources. Still, in some instances, performing the first action may include migrating connections that include the first type of connection.

At block B616, the process 600 may include determining, during a second period of time, a third amount of resources associated with the second connection. For instance, the first server 302(1) may determine the third amount of resources associated with the first connection. In some instances, to determine the third amount of resources, the first server 302(1) may determine the type of connection. The type of connection may be based on whether the first connection is the first type of connection, whether the first connection is the second type of connection, and/or one or more characteristics associated with the source data 422 being received from the first source 304(1) via the first connection. In some instances, the type of connection determined during the second period of time may be different than the type of connection determined during the first period of time. The first server 302(1) may then determine the third amount of resources based on the type of connection.

At block B618, the process 600 may include determining, during the second period of time, a fourth amount of resources associated with the second connection. For instance, the first server 302(1) may determine the fourth amount of resources associated with the second connection. In some instances, to determine the fourth amount of resources, the first server 302(1) may determine the type of connection. The type of connection may be based on whether the second connection is the first type of connection, whether the second connection is the second type of connection, and/or one or more characteristics associated with the source data 422 being received from the second source 304(2) via the second connection. In some instances, the type of connection determined during the second period of time may be different than the type of connection determined during the first period of time. The first server 302(1) may then determine the fourth amount of resources based on the type of connection.

At block B620, the process 600 may include determining a second total amount of resources using the third amount of resources and the fourth amount of resources. For instance, the first server 302(1) may determine, using the third amount of resources and the fourth amount of resources, the second total amount of resources associated with the resource. In some instances, the first server 302(1) determines the second total amount of resources by adding together the third amount of resources and the fourth amount of resources.

At block B622, the process 600 may include determining that the second total amount of resources satisfies a second threshold. For instance, the first server 302(1) may determine that the second total amount of resources satisfies the second threshold. In some instances, the second threshold is associated with migrating connections that are the first type of connection. In some instances, the second threshold is associated with migrating connections that are the second type of connection.

At block B624, the process 600 may include performing at least a second action. For instance, based on the second total amount of resources satisfying the second threshold, the first server 302(1) may perform the second action. In some instances, performing the second action may include migrating the connections that are the first type of connection. In some instances, performing the second action may include migrating the connections that are the second type of connection.

Figure 7:
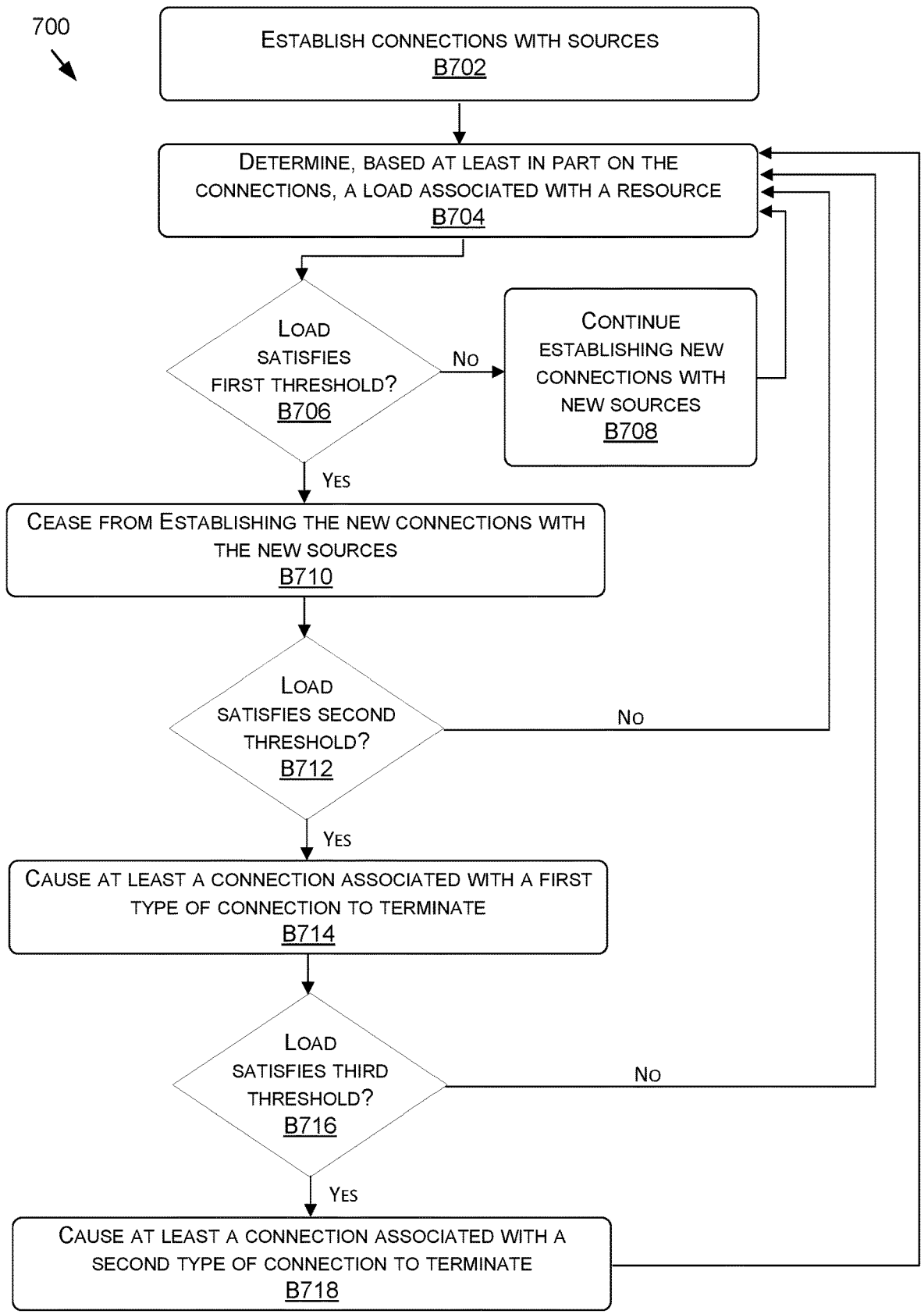
FIG. 7 is a flowchart illustrating an example process for managing persistent connections using different thresholds, according to various aspects of the present disclosure.

FIG. 7 illustrates an example process 700 for managing persistent connections using different thresholds, according to various aspects of the present disclosure. At block B702, the process 700 may include establishing connections with sources. For instance, the server 402 may establish the connections with the sources 304(1)-(M). In some instances, the connections are persistent connections that the server 402 establishes with the sources 304(1)-(M). In some instances, one or more of the connections may be a first type of connection (e.g., idle) and one or more of the connections may be a second type of connection (e.g., active).

At block B704, the process 700 may include determining, based at least in part on the connections, a resource load associated with a resource. For instance, the server 402 may determine the load associated with the resource. In some instances, to determine the resource load, and for individual connections, the server 402 may determine the type of connection. The server 402 may then determine an individual resource load based on the type of connection. Using the individual resource loads for the connections, the server 402 may determine the total resource load associated with the resource.

At block B706 the process 700 may include determining whether the resource load satisfies a first threshold. For instance, the server 402 may determine whether the resource load satisfies the first threshold. If the resource load does not satisfy the first threshold, then at block B708 the process 700 may include continuing to establish new connections with new sources. For instance, if the server 402 determines that the resource load does not satisfy the first threshold, then the server 402 may continue to establish new connections with new sources 304(1)-(M). The process 700 may then return to block B704.

However, if it is determined at block B706 that the resource load satisfies the first threshold, then at block B710 the process 700 may include ceasing establishing the new connections with the new sources. For instance, if the server 402 determines that the resource load satisfies the first threshold, then the server 402 may cease establishing the new connections with the new sources 304(1)-(M).

At block B712, the process 700 may include determining whether the resource load satisfies a second threshold. For instance, the server 402 may determine whether the resource load satisfies the second threshold. If the resource load does not satisfy the second threshold, then the process 700 may return to block B704. However, if it is determined at block B712 that the resource load satisfies the second threshold, then at block B714 the process 700 may include causing at least one connection associated with a first type of connection to terminate. For instance, if the server 402 determines that the resource load satisfies the second threshold, then the server 402 may terminate the connection associated with the first type of connection. In some instances, the first type of connection is an idle connection.

At block B716 the process 700 may include determining whether the resource load satisfies a third threshold. For instance, the server 402 may determine whether the resource load satisfies the third threshold. If the resource load does not satisfy the third threshold, then the process 700 may return to block B704. However, if it is determined at block B716 that the resource load satisfies the third threshold, then at block B718 the process 700 may include causing at least one connection associated with a second type of connection to terminate. For instance, if the server 402 determines that the resource load satisfies the third threshold, then the server 402 may terminate the connection associated with the second type of connection. In some instances, the second type of connection is an active connection. In some instances, the process 700 may then return to block B704.

Figure 8:
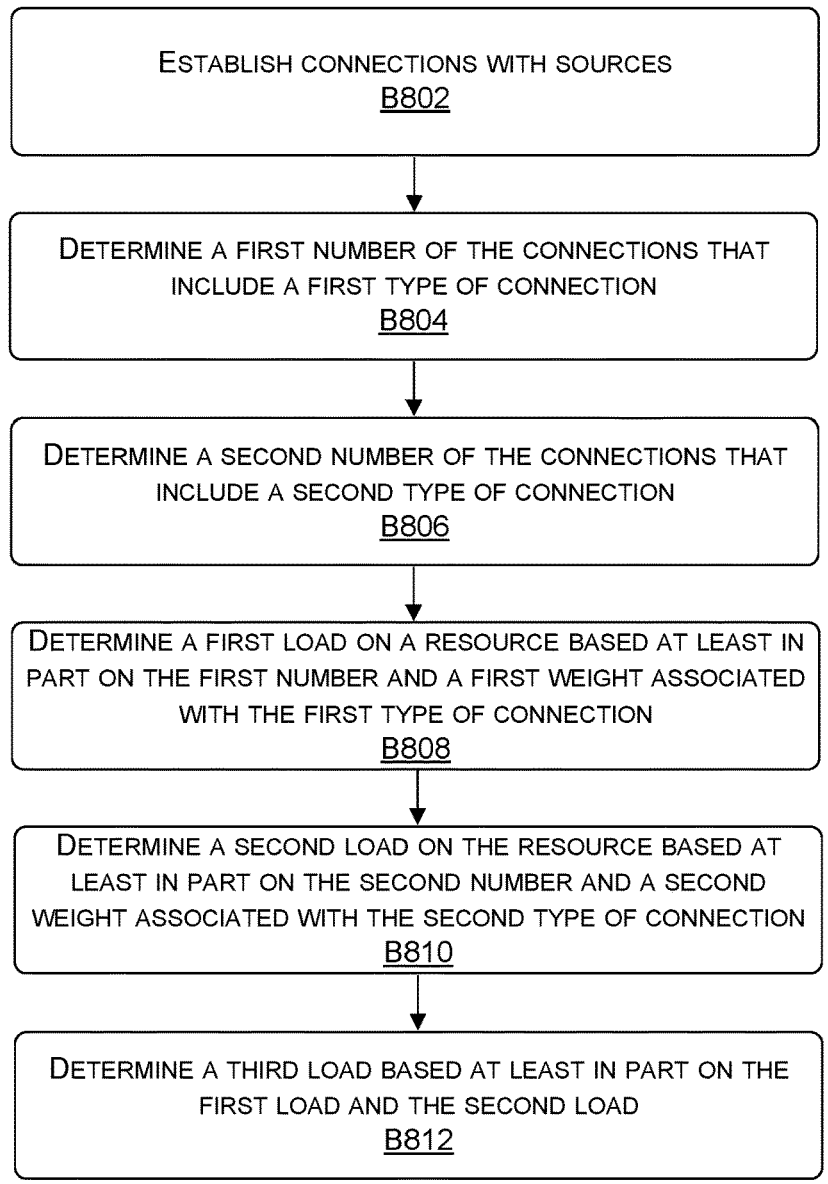
FIG. 8 is a flowchart illustrating an example process for determining an amount of resource usage, according to various aspects of the present disclosure.

FIG. 8 illustrates an example process 800 for determining an amount of resource usage, according to various aspects of the present disclosure. At block B802, the process 800 may include establishing connections with sources. For instance, the server 402 may establish the connections with the sources 304(1)-(M). In some instances, the connections are persistent connections that the server 402 establishes with the sources 304(1)-(M). In some instances, one or more of the connections may be a first type of connection (e.g., idle) and one or more of the connections may be a second type of connection (e.g., active).

At block B804, the process 800 may include determining a first number of the connections that are a first type of connection. For instance, the server 402 may determine the first number of the connections that are the first type of connection. In some instances, the server 402 may determine that a connection is the first type of connection when the connection is an idle connection. In some instances, the server 402 may determine that a connection is the first type of connection when the source 304(1)-(M) associated with the connection is sending data that includes a first characteristic. For example, the server 402 may determine that the connection is the first type of connection when the source 304(1)-(M) is streaming video data.

At block B806, the process 800 may include determining a second number of the connections that are a second type of connection. For instance, the server 402 may determine the second number of the connections that are the second type of connection. In some instances, the server 402 may determine that a connection is the second type of connection when the connection is an active connection. In some instances, the server 402 may determine that a connection is the second type of connection when the source 304(1)-(M) associated with the connection is sending data that includes a second characteristic. For example, the server 402 may determine that the connection is the second type of connection when the source 304(1)-(M) is sending audio data.

At block B808, the process 800 may include determining a first resource load on a resource based at least in part on the first number and a first weight associated with the first type of connection. For instance, the server 402 may store the assignment data 420 representing the first weight for the first type of connection. The server 402 may then use the assignment data 420 to determine the first resource load. In some instances, the server 402 determines the first load by multiplying the first number by the first weight.

At block B810, the process 800 may include determining a second resource load on the resource based at least in part on the second number and a second weight associated with the second type of connection. For instance, the server 402 may store the assignment data 420 representing the second weight for the second type of connection. The server 402 may then use the assignment data 420 to determine the second resource load. In some instances, the server 402 determines the second resource load by multiplying the second number by the second weight.

At block B812, the process 800 may include determining a third resource load based at least in part on the first resource load and the second resource load. For instance, the server 402 may determine the third resource load based at least in part on the first resource load and the second resource load. In some instances, the server 402 determines the third resource load by adding together the first resource load and the second resource load. In some instances, after determining the third resource load, the server 402 may compare the third resource load to one or more thresholds. In such instances, the server 402 may perform one or more actions when the third resource load satisfies the one or more thresholds.

Figure 9:
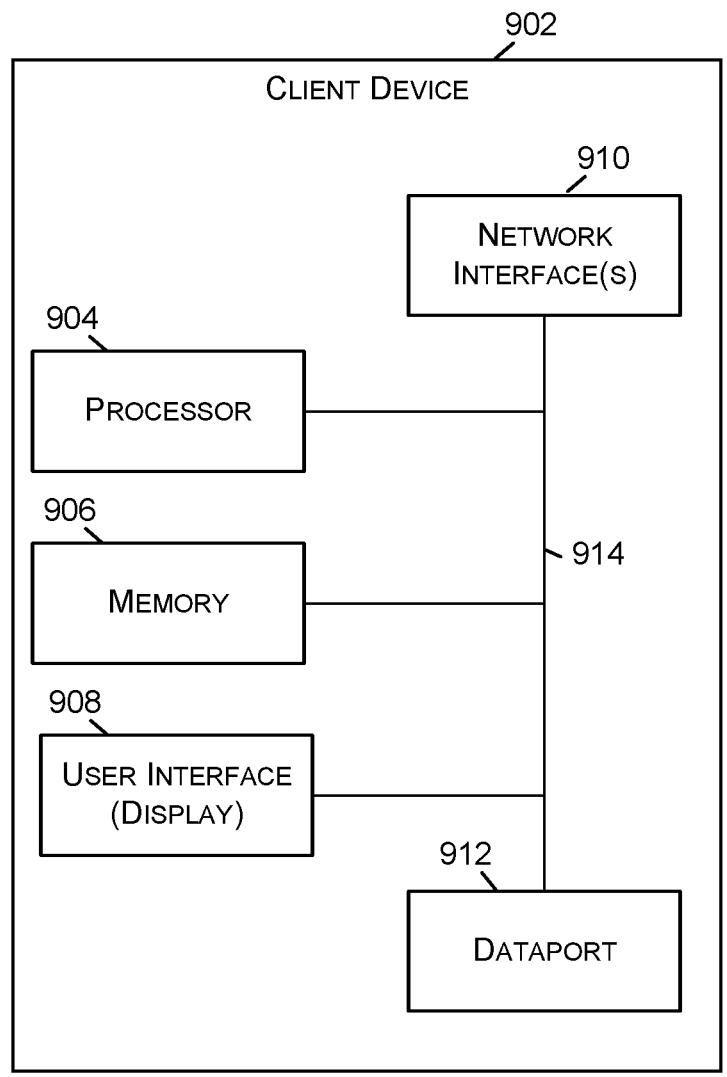
FIG. 9 is a functional block diagram of a client device on which the present embodiments may be implemented, according to various aspects of the present disclosure.

FIG. 9 is a functional block diagram of a client device 902 on which the present embodiments may be implemented according to various aspects of the present disclosure. The client devices 306(1)-(O) described with reference to FIG. 3 may include some or all of the components and/or functionality of the client device 902. The client device 902 may comprise, for example, a smartphone.

With reference to FIG. 9, the client device 902 includes a processor 904, a memory 906, a user interface 908, a communication module 910, and a dataport 912. These components are communicatively coupled together by an interconnect bus 914. The processor 904 may include any processor used in smartphones and/or portable computing devices, such as an ARM processor (a processor based on the RISC (reduced instruction set computer) architecture developed by Advanced RISC Machines (ARM).). In some embodiments, the processor 904 may include one or more other processors, such as one or more conventional microprocessors, and/or one or more supplementary co-processors, such as math co-processors.

The memory 906 may include both operating memory, such as random-access memory (RAM), as well as data storage, such as read-only memory (ROM), hard drives, flash memory, or any other suitable memory/storage element. The memory 906 may include removable memory elements, such as a CompactFlash card, a MultiMediaCard (MMC), and/or a Secure Digital (SD) card. In some embodiments, the memory 906 may comprise a combination of magnetic, optical, and/or semiconductor memory, and may include, for example, RAM, ROM, flash drive, and/or a hard disk or drive. The processor 904 and the memory 906 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 904 may be connected to the memory 906 via the dataport 912.

The user interface 908 may include any user interface or presentation elements suitable for a smartphone and/or a portable computing device, such as a keypad, a display screen, a touchscreen, a microphone, and a speaker. The communication module 910 is configured to handle communication links between the client device 902 and other, external devices or receivers, and to route incoming/outgoing data appropriately. For example, inbound data from the dataport 912 may be routed through the communication module 910 before being directed to the processor 904, and outbound data from the processor 904 may be routed through the communication module 910 before being directed to the dataport 912. The communication module 910 may include one or more transceiver modules capable of transmitting and receiving data, and using, for example, one or more protocols and/or technologies, such as GSM, UMTS (3GSM), IS-95 (CDMA one), IS-900 (CDMA 900), LTE, FDMA, TDMA, W-CDMA, CDMA, OFDMA, Wi-Fi, WiMAX, or any other protocol and/or technology.

The dataport 912 may be any type of connector used for physically interfacing with a smartphone and/or a portable computing device, such as a mini-USB port or an IPHONE®/IPOD® 30-pin connector or LIGHTNING® connector. In other embodiments, the dataport 912 may include multiple communication channels for simultaneous communication with, for example, other processors, servers, and/or client terminals.

The memory 906 may store instructions for communicating with other systems, such as a computer. The memory 906 may store, for example, a program (e.g., computer program code) adapted to direct the processor 904 in accordance with the present embodiments. The instructions also may include program elements, such as an operating system. While execution of sequences of instructions in the program causes the processor 904 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 10:
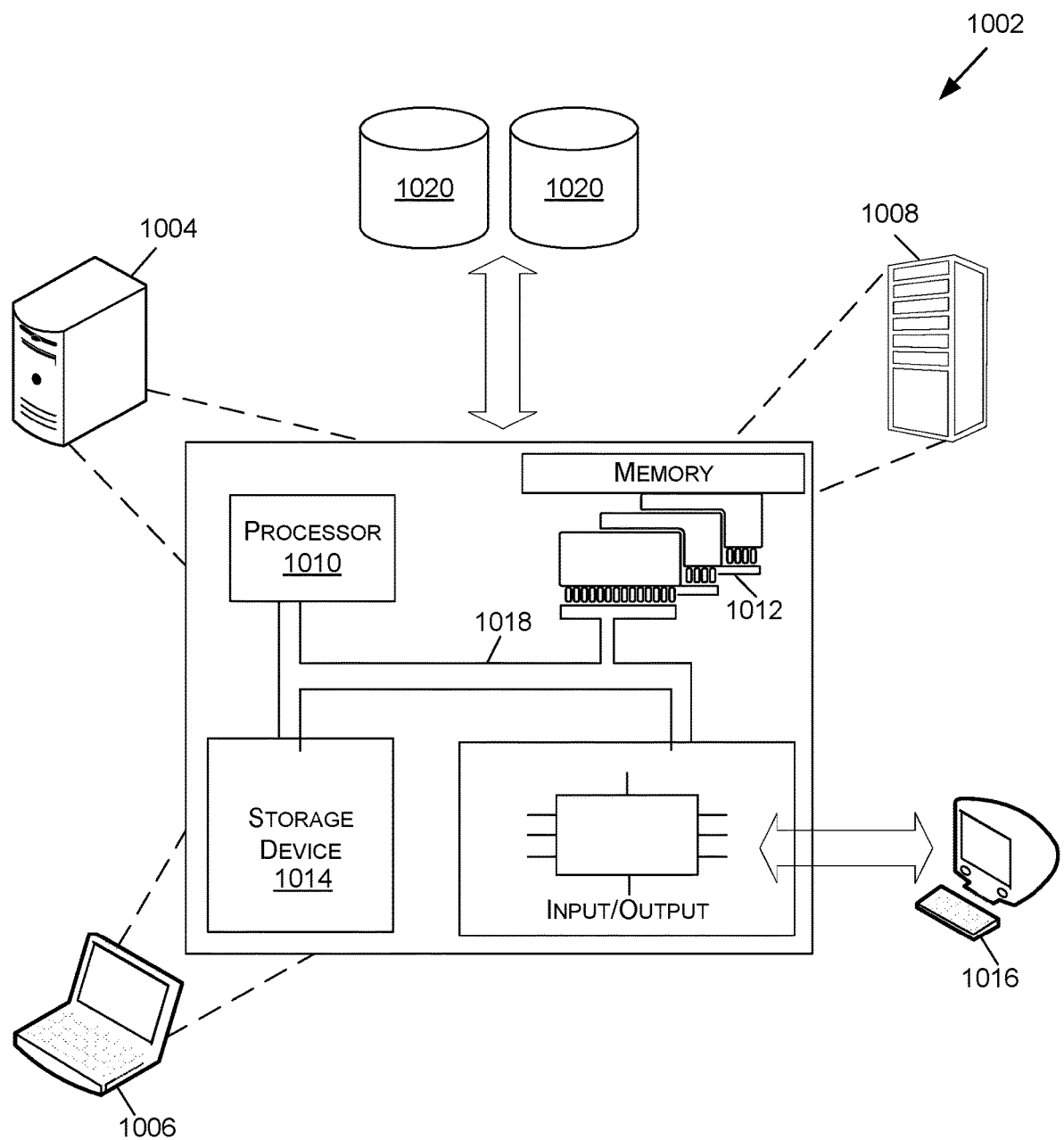
FIG. 10 is a functional block diagram of a general-purpose computing system on which the present embodiments may be implemented, according to various aspects of present disclosure.

FIG. 10 is a functional block diagram of a general-purpose computing system on which the present embodiments may be implemented according to various aspects of the present disclosure. The computer system 1002 may be embodied in at least one of a personal computer (also referred to as a desktop computer) 1004, a portable computer (also referred to as a laptop or notebook computer) 1006, and/or a server 1008 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1002 may execute at least some of the operations described above. The computer system 1002 may include at least one processor 1010, memory 1012, at least one storage device 1014, and input/output (I/O) devices 1016. Some or all of the components 1010, 1012, 1014, 1016 may be interconnected via a system bus 1018. The processor 1010 may be single- or multi-threaded and may have one or more cores. The processor 1010 execute instructions, such as those stored in the memory 1012 and/or in the storage device 1014. Information may be received and output using one or more I/O devices 1016.

The memory 1012 may store information, and may be a computer-readable medium, such as volatile or non-volatile memory. The storage device(s) 1014 may provide storage for the system 1002 and, in some embodiments, may be a computer-readable medium. In various aspects, the storage device(s) 1014 may be a flash memory device, a hard disk device, an optical disk device, a tape device, or any other type of storage device.

The I/O devices 1016 may provide input/output operations for the system 1002. The I/O devices 1016 may include a keyboard, a pointing device, and/or a microphone. The I/O devices 1016 may further include a display unit for displaying graphical user interfaces, a speaker, and/or a printer. External data may be stored in one or more accessible external databases 1020.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Figure 11:
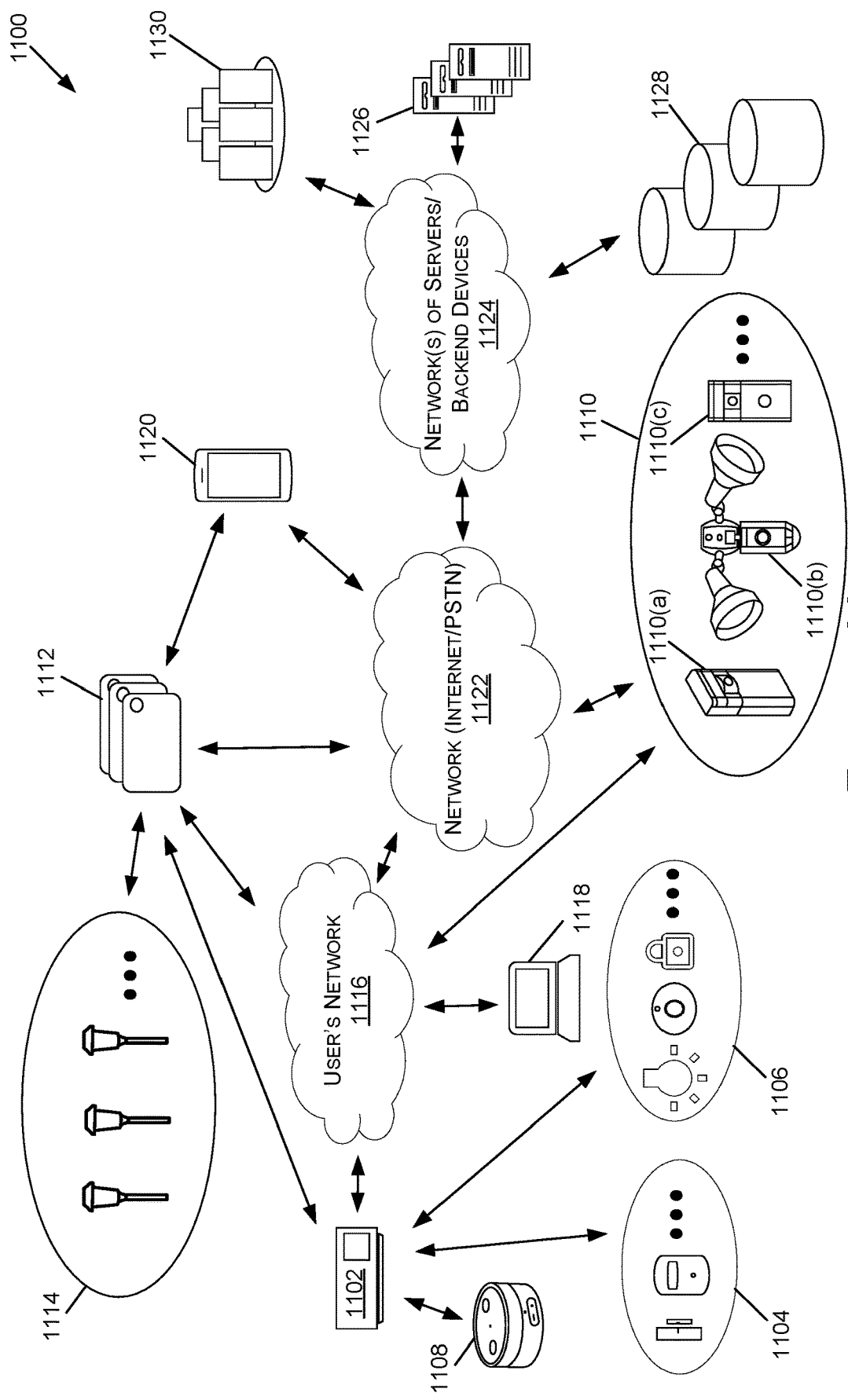
FIG. 11 is a functional block diagram illustrating a system for communicating in a network, according to various aspects of the present disclosure.

FIG. 11 is a functional block diagram illustrating a system 1100 for communicating in a network according to various aspects of the present disclosure. Home automation, or smart home, is building automation for the home. Home automation enable users (e.g., homeowners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 1102, sensors 1104, automation devices 1106, a virtual assistant (VA) device 1108, Audio/Video (A/V) devices 1110, electronic device(s) 1112 (although only one is shown for clarity reasons), light emitters 1114, when remotely monitored and controlled via a network (Internet/a public switched telephone network (PSTN)) 1122, may be considered to be components of the "Internet of Things." Smart home systems may include switches and/or sensors (e.g., the sensors 1104) connected to a central hub such as the smart-home hub device 1102 and/or the VA device 1108 (the hub device 1102 and/or the VA device 1108 may alternatively be referred to as a gateway, a controller, a home-automation hub, or an intelligent personal assistance device) from which the system 1100 may be controlled through various user interfaces, such as voice commands and/or a touchscreen. Various examples, of user interfaces may include any or all of a wall-mounted terminal (e.g., a keypad, a touchscreen, etc.), software installed on the client devices 1118, 1120 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 1102 and/or the VA device 1108) and causing the smart home devices (e.g., the sensors 1104, the automation devices 1106, etc.) to perform an operation in response to the user input.

The hub device 1102, the VA device 1108, the sensors 1104, the automation devices 1106, the A/V devices 1110, the electronic device(s) 1112, the light emitters 1114, and/or client devices 1118, 1120 may use one or more wired and/or wireless communication protocols to communicate, including, for example and without limitation, Wi-Fi (e.g., the user's network 1116), X11, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and the like.

The user's network 1116 may be, for example, a wired and/or wireless network. If the user's network 1116 is wireless, or includes a wireless component, the user's network 1116 may be a Wi-Fi network compatible with the IEEE 802.11 standard and/or other wireless communication standard(s). Furthermore, the user's network 1116 may be connected to other networks such as the network 1122, which may comprise, for example, the Internet and/or PSTN.

The system 1100 may include one or more A/V devices 1110. The A/V devices 1110 may include security cameras 1110(*a*), light cameras 1110(*b*) (e.g., floodlight cameras, spotlight cameras, etc.), A/V doorbells 1110(*c*) (e.g., wall powered and/or battery powered A/V doorbells), and/or other devices capable of recording audio data and/or image data. The A/V devices 1110 may be configured to access a user's network 1116 to connect to a network (Internet/

PSTN) 1122 and/or may be configured to access a cellular network to connect to the network (Internet/PSTN) 1122.

The system 1100 may further include a smart-home hub device 1102 connected to the user's network 1116 and/or the network (Internet/PSTN) 1122. The smart-home hub device 1102 (also known as a home automation hub, gateway device, or network device(s)), may comprise any device that facilitates communication with and control of the sensors 1104, automation devices 1106, the VA device 1108, the electronic device(s) 1112, the light emitters 1114, and/or the one or more A/V devices 1110. For example, the smart-home hub device 1102 may be a component of a security system and/or a home automation system installed at a location (e.g., a property, a premise, a home, a business, etc.). In some embodiments, the A/V devices 1110, the VA device 1108, the sensors 1104, the electronic device(s) 1112, the light emitters 1114, and/or the automation devices 1106 communicate with the smart-home hub device 1102 directly and/or indirectly using one or more wireless and/or wired communication protocols (e.g., BLE, Zigbee, Z-Wave, etc.), the user's network 1116 (e.g., Wi-Fi, Ethernet, etc.), and/or the network (Internet/PSTN) 1122. In some of the present embodiments, the A/V devices 1110, the VA device 1108, the sensors 1104, the electronic device(s) 1112, the light emitters 1114, and/or the automation devices 1106 may, in addition to or in lieu of communicating with the smart-home hub device 1102, communicate with the client devices 1118, 1120, the VA device 1108, and/or one or more of components of the network of servers/backend devices 1124 directly and/or indirectly via the user's network 1116 and/or the network (Internet/PSTN) 1122.

As illustrated in FIG. 11, the system 1100 includes the VA device 1108. The VA device 1108 may be connected to the user's network 1116 and/or the network (Internet/PSTN) 1122. The VA device 1108 may include an intelligent personal assistant, such as, without limitation, Amazon Alexa® and/or Apple Siri®. For example, the VA device 1108 may be configured to receive voice commands, process the voice commands to determine one or more actions and/or responses (e.g., transmit the voice commands to the one or more components of the network of servers/backend devices 1124 for processing), and perform the one or more actions and/or responses, such as to activate and/or change the status of one or more of the sensors 1104, automation devices 1106, the electronic device(s) 1112, the light emitters 1114, or the A/V devices 1110. In some embodiments, the VA device 1108 is configured to process user inputs (e.g., voice commands) without transmitting information to the network of servers/backend devices 1124 for processing. The VA device 1108 may include at least one speaker (e.g., for playing music, for outputting the audio data generated by the A/V devices 1110, for outputting the voice of a digital assistant, etc.), at least one a microphone (e.g., for receiving commands, for recording audio data, etc.), and a display (e.g., for displaying a user interface, for displaying the image data generated by the A/V devices 1110, etc.). In various embodiments, the VA device 1108 may include an array of speakers that are able to produce beams of sound.

Although illustrated as a separate component in FIG. 11, in some embodiments the VA device 1108 may not be a separate component from the hub device 1102. In such embodiments, the hub device 1102 may include the functionality of the VA device 1108 or the VA device 1108 may include the functionality of the hub device 1102.

The VA device 1108, the hub device 1102, and/or the combination thereof may be configured to communicate with the A/V devices 1110 in response to inputs (e.g., voice inputs, touch inputs, etc.) from users. For example, the VA device 1108, the hub device 1102, and/or the combination thereof may receive an input indicating a request to turn on the exterior lights (e.g., the light emitter(s) 1114). The VA device 1108, the hub device 1102, and/or the combination thereof may then generate and transmit data representative of the input to the A/V device(s) 1110 over the first network. In some examples, the data representative of the input is transmitted to the A/V device(s) 1110 over the first network and/or the network (Internet/PSTN) 1122 via the backend server(s) 1126. In other examples, the data representative of the input is transmitted directly to the A/V device(s) 1110 over the first network.

The one or more sensors 1104 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

The one or more automation devices 1106 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices. In some examples, the electronic device(s) 1112 and/or the light emitters 1114 may be considered automation devices and/or may be considered part of an automation device or system (e.g., an outdoor lighting system, an indoor lighting system, and indoor/outdoor lighting system, etc.).

As described herein, in some of the present embodiments, some or all of the client devices 1118, 1120, the A/V device(s) 1110, the smart-home hub device 1102, the VA device 1108, the sensors 1104, the automation devices 1106, the electronic device(s) 1112, and the light emitters 1114, may be referred to as a security system and/or a home-automation system. The security system and/or home-automation system may be installed at location, such as a property, home, business, or premises for the purpose of securing and/or automating all or a portion of the location.

The system 1100 may further include one or more client devices 1118, 1120 (which may represent, and/or be similar to, one or more of the client device 306(1)-(O) or the client device 902). The client devices 1118, 1120 may communicate with and/or be associated with (e.g., capable of access to and control of) the A/V devices 1110, a smart-home hub device 1102, the VA device 1108, sensors 1104, automation devices 1106, the electronic device(s) 1112, and/or the light emitters 1114. In various embodiments, the client devices 1118, 1120 communicate with other devices using one or more wireless and/or wired communication protocols, the user's network, and/or the network (Internet/PSTN) 1122, as described herein. The client devices 1118, 1120 may comprise, for example, a mobile device such as a smartphone or a personal digital assistant (PDA), or a computing device such as a tablet computer, a laptop computer, a desktop computer, etc. In some embodiments, the client devices 1118, 1120 includes a connected device, such as a smart watch, Bluetooth headphones, another wearable device, or the like. In such embodiments, the client devices 1118, 1120 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 1110, the hub device 1102, the VA device 1108, the automation devices 1106, the sensors 1104, the electronic device(s) 1112, the light emitters 1114, and/or the client devices 1118, 1120 may also communicate, via the user's network 1116 and/or the network (Internet/PSTN) 1122, with network(s) of servers and/or backend devices 1126, such as (but not limited to) one or more remote storage devices 1128 (may be referred to interchangeably as "cloud storage device(s)"), one or more backend server(s) 1126, and one or more backend application programming interfaces (APIs) 1130. While FIG. 11 illustrates the storage device 1128, the backend server(s) 1126, and the backend API 1130 as components separate from the network 1124, it is to be understood that the storage device 1128, the backend server(s) 1126, and/or the backend API 1130 may be considered to be components of the network 1124. For example, the network 1124 may include a data center with a plurality of computing resources used to implement the storage device 1128, the backend server(s) 1126, and the backend API 1130.

The backend server(s) 1126 may comprise a computer program or other computer executable code that, when executed by processor(s) of the backend server(s) 1126, causes the backend server(s) 1126 to wait for requests from other computer systems or software (clients) and provide responses. In an embodiment, the backend server(s) 1126 shares data and/or hardware and/or software resources among the client devices 1118, 1120. This architecture is called the client-server model. The client devices 1118, 1120 may run on the same computer or may connect to the backend server(s) 1126 over the network (Internet/PSTN) 1122 and/or the network 1124. Examples of computing servers include database servers, file servers, mail servers, print servers, web servers, game servers, and application servers. The term server may be construed broadly to include any computerized process that shares a resource to one or more client processes.

The backend API 1130 may comprise, for example, a server (e.g. a real server, or a virtual machine, or a machine running in a cloud infrastructure as a service), or multiple servers networked together, exposing at least one API to clients. In various embodiments, the backend API 1130 is provided by servers including various components such as an application server (e.g. software servers), a caching layer, a database layer, or other components suitable for implementing one or more APIs. The backend API 1130 may, for example, comprise a plurality of applications, each of which communicate with one another using one or more public APIs. In some embodiments, the backend API 1130 maintains user data and provides user management capabilities, thereby reducing the load (e.g., memory and processor consumption) of the client devices 1118, 1120.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 1130 illustrated in FIG. 11 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server(s) 1126) running on one or more computers (such as a dedicated server computer offering multiple services) and accessed via a network by client components running on other devices (e.g., client devices 1118, 1120). However, the client and server components can both be run on the same machine. Clients and servers may have a user interface, and sometimes other hardware associated with them.

The network 1124 may be any wireless network, any wired network, or a combination thereof, configured to operatively couple the above-mentioned modules, devices, components, and/or systems as illustrated in FIG. 11. For example, the network 1124, the user's network 1116, and/or the network (Internet PSTN) 1122 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The system 1100 may also include the electronic device(s) 1112. The electronic device(s) 1112 may be configured to control the light emitters 1114. For example, one or more of the electronic device(s) 1112 may include, but is not limited to, a transformer, a light switch, a power source, a light controller, and/or any other type of device that is cable of controlling the light emitters 1114. The light emitters 1114 may include pathway lights, walkway lights, floodlights, spotlights, security lights, dome lights, entryway lights, garden lights, outdoor lights, indoor lights, landscape lighting, accent lighting, wall sconces, bullets, globes, and/or any other type of electronic device that includes a light source capable of emitting light.

In some instances, one or more of the network 1124, the user's network 1116, and/or the network (Internet PSTN) 1122 may represent, and/or be similar to, the network(s) 430. Additionally, in some instances, one or more of the storage devices 1128, the backend server(s) 1126, and the backend API 1130 may represent, and/or be similar to, the server 402. Furthermore, in some instances, one or more of the hub device 1102, the sensor(s) 1104, the automation device(s) 1106, the VA device 1108, the A/V device(s) 1110, the electronic device(s) 1112, and the light emitter(s) 1114 may represent, and/or be similar to, the sources 304(1)-(M).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

EXAMPLE CLAUSES

In a first aspect, a system comprises: one or more network interfaces; one or more processors; and one or more computer-readable media storing instructions that, when executed by the one or more processors, cause the one or more processors to perform operations comprising: establishing, using the one or more network interfaces, a first persistent connection with a first data source; establishing, using the one or more network interfaces, a second persistent connection with a second data source; determining, during a first period of time, that the first persistent connection is idle during the first period of time; determining a first amount of resources being used by the first persistent connection during the first period of time; determining, during the first period of time, that the second persistent connection is idle during the first period of time; determining a second amount of resources being used by the second persistent connection during the first period of time; determining a first total amount of resources in use during the first period of time using at least the first amount of resources and the second amount of resources; determining that the first total amount of resources in use meets or exceeds a first threshold; after determining that the first total amount of resources in use meets or exceeds the first threshold, sending, to one or more computing devices, data indicating that the system will not establish a third persistent connection with a third data source; determining, during a second period of time, that the first persistent connection is idle during the second period of time; determining, during the second period of time, a third amount of resources being used by the first persistent connection; determining, during the second period of time, that the second persistent connection is active during the second period of time; determining, during the second period of time, a fourth amount of resources being used by the second persistent connection; determining a second total amount of resources in use during the second period of time using at least the third amount of resources and the fourth amount of resources; determining that the second total amount of resources in use meets or exceeds a second threshold that is higher than the first threshold; and after determining that the second total amount of resources in use meets or exceeds the second threshold, causing the first persistent connection to terminate.

In an embodiment of the first aspect, the one or more computer-readable media storing further instructions that, when executed by the one or more processors, cause the one or more processors to perform further operations comprising: establishing, using the one or more network interfaces, a fourth persistent connection with a fourth data source; determining, during a third period of time, that the second persistent connection is active during the third period of time; determining, during the third period of time, a fifth amount of resources being used by the second persistent connection; determining, during the third period of time, that the fourth persistent connection is active during the third period of time; determining, during the third period of time, a sixth amount of resources being used by the fourth persistent connection; determining a third total amount of resources in use during the third period of time using at least the fifth amount of resources and the sixth amount of resources; determining that the third total amount of resources in use meets or exceeds a third threshold that is higher than the second threshold; and after determining that the third total amount of resources in use meets or exceeds the third threshold, causing the second persistent connection to terminate.

In another embodiment of the first aspect, the one or more computer-readable media storing further instructions that, when executed by the one or more processors, cause the one or more processors to perform further operations comprising: selecting the first persistent connection for termination based at least in part on the first persistent connection being idle during the second period of time and the second persistent connection being active during the second period of time.

In a second aspect, a method comprises: establishing a first persistent connection with a first video data source; establishing a second persistent connection with a second video data source; determining that the first persistent connection is a first type of connection; receiving, using the second persistent connection, application data from the second video data source; after receiving the application data, determining that the second persistent connection is a second type of connection; determining an amount of at least one computing resource in use based at least in part on the first persistent connection being the first type of connection and the second persistent connection being the second type of connection; and after determining the amount of the at least one computing resource in use, sending, to one or more computing devices, determining to forgo establishing a third persistent connection with a third video data source.

In an embodiment of the second aspect, the amount of the at least one computing resource in use is a first amount of the at least one computing resource in use, and determining the first amount of the at least one computing resource in use comprises: determining a second amount of the at least one computing resource being used by the first persistent connection based at least in part on the first persistent connection being the first type of connection and a first weight associated with the first type of connection; determining a third amount of the at least one computing resource being used by the second persistent connection based at least in part on the second persistent connection being the second type of connection and a second weight associated with the second type of connection; and determining the first amount of the at least one computing resource in use using at least the second amount and the third amount.

In another embodiment of the second aspect, the method further comprising: determining that the amount of the at least one computing resource meets or exceeds a threshold, determining to forgo establishing the third persistent connection with the third video data source occurs after determining that the amount of the at least one computing resource in use meets or exceeds the threshold.

In another embodiment of the second aspect, the method further comprising: establishing a fourth persistent connection with a fourth video data source; receiving, using the fourth persistent connection, additional application data from the fourth video data source; after receiving the additional application data, determining that the fourth persistent connection is the second type of connection; determining an additional amount of the at least one computing resource based at least in part on the first persistent connection being the first type of connection, the second connection being the second type of connection, and the fourth persistent connection being the second type of connection; determining that the additional amount of the at least one computing resource meets or exceeds an additional threshold; and after determining that the additional amount of the at least one computing resource meets or exceeds the additional threshold, causing the first persistent connection to terminate.

In another embodiment of the second aspect, the method further comprising: after determining to forgo establishing the third persistent connection with the third data source, receiving, using the first persistent connection, additional application data from the first data source; after receiving the additional application data, determining that the first persistent connection is the second type of connection; determining an additional amount of the at least one computing resource based at least in part on the first persistent connection being the second type of connection and the second persistent connection being the second type of connection; determining that the additional amount of the at least one computing resource meets or exceeds an additional threshold; and after determining that the additional amount of the at least one computing resource meets or exceeds the additional threshold, causing at least one of the first persistent connection or the second persistent connection to terminate.

In another embodiment of the second aspect, the first type of connection is an idle connection, and the second type of connection is an active connection.

In another embodiment of the second aspect, the application data is second application data, the method further comprising: receiving, using the first persistent connection, first application data from the first video data source; determining at least a first characteristic associated with the first application data; and determining at least a second characteristic associated with the second application data, determining that the first persistent connection is the first type of connection is based on the determining that the first application data is associated with the first characteristic, and determining that the second persistent connection is the second type of connection is based on the determining that the second application data is associated with the second characteristic.

In another embodiment of the second aspect, the method further comprising: after determining to forgo establishing the third persistent connection with the third video data source, determining that the second persistent connection is the first type of connection; determining an additional amount of the at least one computing resource based at least in part on the first persistent connection being the first type of connection and the second persistent connection being the first type of connection; and after determining the amount of the at least one computing resource, establishing a fourth persistent connection with a fourth video data source.

In another embodiment of the second aspect, determining the amount of the at least one computing resource comprises determining, based at least in part on the first persistent connection being the first type of connection and the second persistent connection being the second type of connection, at least one of: a first amount of at least one central processing unit that is being used by at least the first persistent connection and the second persistent connection; a second amount of memory that is being used by at least the first persistent connection and the second persistent connection; or a third amount of a network resource that is being used by at least the first persistent connection and the second persistent connection.

In a third aspect, a method comprises: maintaining a plurality of persistent connections with a plurality of data sources, the plurality of persistent connections include a first subset of idle connections and a second subset of active connections; monitoring, for a monitoring period, an amount of at least one computing resource in use by the plurality of persistent connections, during the monitoring period at least one of the idle connections in the first subset changes to an active connection; determining, after the at least one of the idle connections in the first subset changes to the active connection, that the amount of the at least one computing resource in use meets or exceeds a threshold; and after determining that the amount of the at least one computing resource in use meets or exceeds the threshold, causing a persistent connection of the plurality of persistent connections to terminate.

In an embodiment of the third aspect, the amount of the at least one computing resource in use is a first amount of the at least one computing resource in use, and determining the first amount of the at least one computing resource in use comprises: determining a first number of the plurality of persistent connections that are the idle connections; determining a second amount of the at least one computing resource in use based at least in part on the first number; determining a second number of the plurality of persistent connections that are the active connections; determining a third amount of the at least one computing resource in use based at least in part on the second number; and determining the first amount of the at least one computing resource in use using at least the second amount of the at least one resource in use and the third amount of the at least one resource in use.

In another embodiment of the third aspect, determining the amount of the at least one computing resource in use comprises dynamically determining the amount of the at least one computing resource in use by the plurality of computing resources.

In another embodiment of the third aspect, the persistent connection is an idle connection from the first subset of idle connection, and the method further comprises: determining that the amount of the at least one resource meets or exceeds an additional threshold; and after determining that the amount of the at least one resource meets or exceeds the additional threshold, causing at least one of the active connection or an additional active connection of the second subset of active connections to terminate.

In another embodiment of the third aspect, the monitored period is a first monitored period and the amount of the at least one computing resource is a first amount of the at least one computing resource, and wherein, before the monitored period, the method further comprises: monitoring, for a second monitoring period, a second amount of at least one computing resource in use by the plurality of persistent connections; determining that the second amount of the at least one computing resource meets or exceeds an additional threshold; after determining that the second amount of the at least one computing resource meets or exceeds the additional threshold, receiving a request for a new persistent connection from a new data source; and forgoing from establishing the new persistent connection.

In another embodiment of the third aspect, the method further comprising: monitoring, for a third monitoring period, a third amount of at least one computing resource in use by the plurality of persistent connections, during the third monitored period an additional active connection changes to an additional idle connection; determining that the third amount of the at least one computing resource exceeds the additional threshold; after determining that the third amount of the at least one computing resource exceeds the additional threshold, receiving an additional request for an additional new persistent connection from an additional new data source; and establishing the additional new persistent connection.

In another embodiment of the third aspect, the method further comprising: determining that the persistent connection is an idle connection; determining that an additional persistent connection of the plurality of persistent connections is an active connection; and selecting the persistent connection for terminating based at least in part on the persistent connection being the idle connection and the additional persistent connection being the active connection.

In another embodiment of the third aspect, the method further comprising: receiving, using the persistent connection, first data from a first data source of the plurality of data sources; determining a first characteristic associated with the first data; receiving, using an additional persistent connection of the plurality of persistent connections, second data from a second data source of the plurality of data sources; determining a second characteristic associated with the second data; and selecting the persistent connection for terminating based at least in part on the first characteristic and the second characteristic.

What is claimed is:

1. A method comprising:
establishing a first persistent connection with a first video data source;
establishing a second persistent connection with a second video data source;
determining that the first persistent connection is a first type of connection;
receiving, using the second persistent connection, first application data from the second video data source;
based at least in part on the receiving of the first application data, determining that the second persistent connection is a second type of connection;
determining a first amount of a first computing resource associated with the first video source based at least in part on the first persistent connection including the first type of connection;
determining a second amount of a second computing resource associated with the second video source based at least in part on the second persistent connection including the second type of connection, the second amount of the second computing resource being greater than the first amount of the first computing resource;
determining a third amount of a third computing resource based at least in part on the first amount of the first computing resource and the second amount of the second computing resource; and
based at least in part on the third amount of the third computing resource, determining to forgo establishing a third persistent connection with a third video data source.

2. The method as recited in claim 1, further comprising:
assigning a first weight to the first type of connection;
assigning a second weight to the second type of connection;
determining, based at least in part on the first persistent connection being the first type of connection, a first number of connections that include the first type of connection; and
determining, based at least in part on the second persistent connection being the second type of connection, a second number of connections that include the second type of connection,
wherein:
the determining the first amount of the first computing resource comprises determining the first amount of the first computing resource based at least in part on the first number of connections and the first weight; and
the determining the second amount of the second computing resource comprises determining the second amount of the second computing resource based at least in part on the second number of connections and the second weight.

3. The method as recited in claim 1, further comprising:
determining that the third amount of the third computing resource meets or exceeds a first threshold,
wherein the determining to forgo the establishing of the third persistent connection with the third video data source is based at least in part on the determining that the third amount of the third computing resource meets or exceeds the first threshold.

4. The method as recited in claim 3, further comprising:
establishing a fourth persistent connection with a fourth video data source;
receiving, using the fourth persistent connection, second application data from the fourth video data source;
determining that the fourth persistent connection is the second type of connection;
determining a fourth amount of a fourth computing resource based at least in part on the first persistent connection being the first type of connection, the second persistent connection being the second type of connection, and the fourth persistent connection being the second type of connection;
determining that the fourth amount of the fourth computing resource meets or exceeds a second threshold; and
based at least in part on the determining that the fourth amount of the fourth computing resource meets or exceeds the second threshold, causing the first persistent connection to terminate.

5. The method as recited in claim 3, further comprising:
after the determining to forgo the establishing of the third persistent connection with the third video data source, receiving, using the first persistent connection, second application data from the first video data source;

based at least in part on the receiving of the second application data, determining that the first persistent connection is the second type of connection;

determining a fourth amount of a fourth computing resource based at least in part on the first persistent connection being the second type of connection and the second persistent connection being the second type of connection;

determining that the fourth amount of the fourth computing resource meets or exceeds a second threshold; and based at least in part on the determining that the fourth amount of the fourth computing resource meets or exceeds the second threshold, causing at least one of the first persistent connection or the second persistent connection to terminate.

6. The method as recited in claim 1, wherein:
the determining that the first persistent connection is the first type of connection comprises determining that the first persistent connection is an idle connection; and
the determining that the second persistent connection is the second type of connection comprises, based at least in part on the receiving of the first application data, determining that the second persistent connection is an active connection.

7. The method as recited in claim 1, further comprising:
receiving, using the first persistent connection, second application data from the first video data source;
determining at least a first characteristic associated with the first application data; and
determining at least a second characteristic associated with the second application data,
wherein:
the determining that the first persistent connection is the first type of connection is based at least in part on the determining that the second application data is associated with the second characteristic; and
the determining that the second persistent connection is the second type of connection is based at least in part on the determining that the first application data is associated with the first characteristic.

8. The method as recited in claim 1, further comprising:
after the determining to forgo the establishing of the third persistent connection with the third video data source, determining that the second persistent connection is the first type of connection;
determining a fourth amount of a fourth computing resource based at least in part on the first persistent connection being the first type of connection and the second persistent connection being the first type of connection; and
based at least in part on the fourth amount of the fourth computing resource, establishing a fourth persistent connection with a fourth video data source.

9. The method as recited in claim 1, wherein the determining the third amount of the third computing resource comprises determining, based at least in part on the first amount of the first computing resource and the second amount of the second computing resource, at least one of:
an amount of at least one central processing unit that is being used by at least the first persistent connection and the second persistent connection;
an amount of memory that is being used by at least the first persistent connection and the second persistent connection; or
an amount of a network resource that is being used by at least the first persistent connection and the second persistent connection.

10. The method as recited in claim 1, wherein the receiving of the first application data from the second video data source comprises at least one of:
receiving, using the second persistent connection, image data from the second video data source;
receiving, using the second persistent connection, audio data from the second video data source;
receiving, using the second persistent connection, input data from the second video data source;
receiving, using the second persistent connection, motion data from the second video data source; or
receiving, using the second persistent connection, message data from the second video data source.

11. The method as recited in claim 1, further comprising:
storing first data indicating that the first type of connection uses a first set amount of a computing resource; and
storing second data indicating that the second type of connection uses a second set amount of a computing resource;
determining, based at least in part on the first type of connection including the first type of connection, a first number connections that include the first type of connection; and
determining, based at least in part on the second persistent connection being the second type of connection, a second number of connections that include the second type of connection,
wherein:
the determining the first amount of the first computing resource comprises multiplying the first set amount of the first computing resource by the first number of connections; and
the determining the second amount of the second computing resource comprises multiplying the second set of amount of the second computing resource by the second number of connections.

12. The method as recited in claim 1, wherein:
the determining the first amount of the first computing resource comprises determining at least one of:
a first amount of at least one central processing unit that is being used by the first persistent connection;
a first amount of memory that is being used by the first persistent connection; or
a first amount of a network resource that is being used by the first persistent connection; and
the determining the second amount of the second computing resource comprises determining at least one of:
a second amount of at least one central processing unit that is being used by the second persistent connection;
a second amount of memory that is being used by the second persistent connection; or
a second amount of a network resource that is being used by the second persistent connection.

13. A system comprising:
one or more processors; and
one or more computer-readable media storing instructions that, when executed by the one or more processors, cause the system to perform operations comprising:
establishing a first persistent connection with a first video data source;
establishing a second persistent connection with a second video data source;

determining, at a first time, a first amount of a first computing resource based at least in part on the first persistent connection and the second persistent connection;

determining that the first amount of the first computing resource satisfies a first threshold;

based at least in part on the first amount of the first computing resource satisfying the first threshold, determining to forgo establishing a third persistent connection with a third video data source;

determining, at a second time, a second amount of a second computing resource based at least in part on the first persistent connection and the second persistent connection;

determining that the second amount of the second computing resource satisfies a second threshold; and based at least in part on the second amount of the second computing resource satisfying the second threshold, causing the first persistent connection to terminate.

14. The system as recited in claim 13, wherein the determining the first amount of the first computing resource comprises:

determining a third amount of a third computing resource associated with the first persistent connection based at least in part on the first persistent connection being a first type of connection and a first weight associated with the first type of connection;

determining a fourth amount of a fourth computing resource associated with the second persistent connection based at least in part on the second persistent connection being a second type of connection and a second weight associated with the second type of connection; and determining, at the first time, the first amount of the first computing resource using at least the third amount of the third computing resource and the fourth amount of the fourth computing resource.

15. The system as recited in claim 13, the one or more computer-readable media storing further instructions that, when executed by the one or more processors, cause the system to perform further operations comprising:

establishing a fourth persistent connection with a fourth video data source, wherein the determining the second amount of the computing resource is further based at least in part on the fourth persistent connection.

16. The system as recited in claim 13, the one or more computer-readable media storing further instructions that, when executed by the one or more processors, cause the system to perform further operations comprising:

determining that the first persistent connection is an idle connection; and determining that the second persistent connection is an active connection, wherein the determining the first amount to the first computing resource comprises determining, at the first time, the first amount of the first computing resource based at least in part on the first persistent connection being the idle connection and the second persistent connection being the active connection.

17. The system as recited in claim 13, the one or more computer-readable media storing further instructions that, when executed by the one or more processors, cause the system to perform further operations comprising:

receiving, using the second persistent connection, first application from the first video data source;

receiving, using the first persistent connection, second application data from the first video data source;

determining at least a first characteristic associated with the first application data;

determining at least a second characteristic associated with the second application data;

determining that the first persistent connection is a first type of connection based at least in part on the determining that the second application data is associated with the second characteristic; and determining that the second persistent connection is a second type of connection is based at least in part on the determining that the first application data is associated with the first characteristic.

18. The system as recited in claim 13, the one or more computer-readable media storing further instructions that, when executed by the one or more processors, cause the system to perform further operations comprising:

determining that the first persistent connection is a first type of persistent connection;

determining that the second persistent connection is a second time of persistent connection, wherein the determining the first amount of the first computing resource is based at least in part on the first persistent connection being the first type of connection and the second persistent connection being the second type of connection; and after the determining to forgo the establishing of the third persistent connection with the third video data source, determining that the first persistent connection is the second type of connection, wherein the determining the second amount of the second computing resource is based at least in part on the first persistent connection being the second type of connection and the second persistent connection being the second type of connection.

19. The system as recited in claim 13, wherein:

the second threshold is greater than the first threshold;

the determining that the first amount of the first computing resource satisfies the first threshold comprises determining that the first amount of the first computing resource is equal to or greater than the first threshold; and the determining that the second amount of the second computing resource satisfies the second threshold comprises determining that the second amount of the second computing resource is equal to or greater than the second threshold.

20. The system as recited in claim 13, the one or more computer-readable media storing further instructions that, when executed by the one or more processors, cause the system to perform further operations comprising:

receiving a request to establish the third persistent connection with the third video source, wherein the determining to forgo the establishing of the third persistent connection with the third video data source is further based at least in part on the request.

* * * * *